US012688823B2

(12) United States Patent
Guo et al.

(10) Patent No.: US 12,688,823 B2
(45) Date of Patent: Jul. 21, 2026

(54) ARRAY SUBSTRATE, DRIVING METHOD THEREOF, AND DISPLAY PANEL

(71) Applicant: KunShan Go-Visionox Opto-Electronics Co., Ltd, Kunshan (CN)

(72) Inventors: Enqing Guo, Kunshan (CN); Cuili Gai, Kunshan (CN); Junfeng Li, Kunshan (CN); Rubo Xing, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 0 days.

(21) Appl. No.: 19/074,429

(22) Filed: Mar. 9, 2025

(65) Prior Publication Data

US 2025/0209977 A1 Jun. 26, 2025

Related U.S. Application Data

(63) Continuation of application No. PCT/CN2023/078152, filed on Feb. 24, 2023.

(30) Foreign Application Priority Data

Sep. 23, 2022 (CN) ......................... 202211161619.1

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01); (Continued)

(58) Field of Classification Search
CPC ............... G09G 3/32; G09G 2300/043; G09G 2300/0819; G09G 2300/0852; G09G 2310/08; G09G 2320/0233
See application file for complete search history.

(56) References Cited

U.S. PATENT DOCUMENTS

2014/0204067 A1* 7/2014 Gupta .................. G09G 3/3291 345/76
2014/0258411 A1* 9/2014 Cheung ............... H04L 65/1089 709/204

(Continued)

FOREIGN PATENT DOCUMENTS

CN 103107182 A 5/2013
CN 108492770 A 9/2018

(Continued)

OTHER PUBLICATIONS

International Search Report of Application No. PCT/CN2023/078152.

(Continued)

*Primary Examiner* — Kenneth B Lee, Jr.
(74) *Attorney, Agent, or Firm* — Kilpatrick Townsend & Stockton LLP

(57) ABSTRACT

Provided are an array substrate, a driving method thereof, and a display panel. The array substrate includes a drive module, an initialization module, a data write module, a storage module, a threshold compensation module, and a light emission control module; where the storage module is configured to store a potential difference between a first connection terminal of the storage module and a second connection terminal of the storage module and couple a potential change of the first connection terminal of the storage module to the second connection terminal of the storage module; the initialization module controls, in response to a first control signal, a potential of the first connection terminal of the storage module and initializes, in response to a second control signal, a first electrode of a light-emitting diode; the threshold compensation module is switched on in response to the first control signal.

19 Claims, 15 Drawing Sheets

(52) U.S. Cl.
CPC . *G09G 2300/0852* (2013.01); *G09G 2310/08* (2013.01); *G09G 2320/0233* (2013.01)

(56) References Cited

U.S. PATENT DOCUMENTS

| | | | | |
|---|---|---|---|---|
| 2016/0104423 | A1 | 4/2016 | Park et al. | |
| 2017/0330511 | A1 | 11/2017 | Feng | |
| 2019/0304364 | A1* | 10/2019 | Xiao | G09G 3/3233 |
| 2022/0148508 | A1* | 5/2022 | Chi | G09G 3/3233 |
| 2024/0144867 | A1* | 5/2024 | Xie | G09G 3/3208 |

FOREIGN PATENT DOCUMENTS

| | | | |
|---|---|---|---|
| CN | 112331134 | A | 2/2021 |
| CN | 112909027 | A | 6/2021 |
| CN | 113299230 | A | 8/2021 |
| CN | 113629104 | A | 11/2021 |
| CN | 114023260 | A | 2/2022 |
| CN | 114241978 | A | 3/2022 |
| CN | 114495822 | A | 5/2022 |
| CN | 114512098 | A | 5/2022 |
| CN | 114550655 | A | 5/2022 |
| CN | 114822415 | A | 7/2022 |
| CN | 114823725 | A | 7/2022 |
| CN | 115273727 | A | 11/2022 |

OTHER PUBLICATIONS

First Office Action of Application No. CN 202211161619.1.
Notice of Registration of Application No. CN 202211161619.1.

* cited by examiner

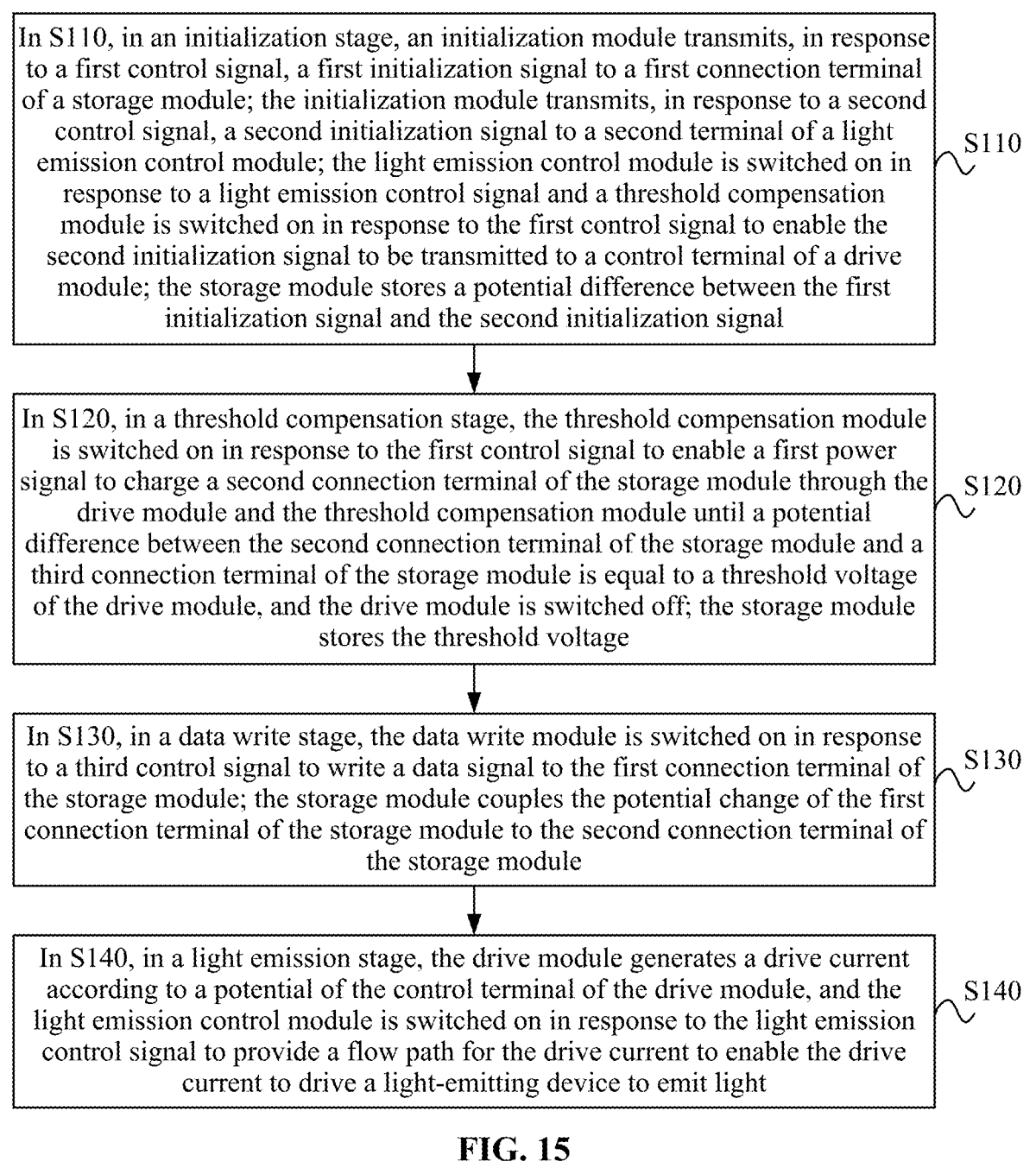

In S110, in an initialization stage, an initialization module transmits, in response to a first control signal, a first initialization signal to a first connection terminal of a storage module; the initialization module transmits, in response to a second control signal, a second initialization signal to a second terminal of a light emission control module; the light emission control module is switched on in response to a light emission control signal and a threshold compensation module is switched on in response to the first control signal to enable the second initialization signal to be transmitted to a control terminal of a drive module; the storage module stores a potential difference between the first initialization signal and the second initialization signal

S110

In S120, in a threshold compensation stage, the threshold compensation module is switched on in response to the first control signal to enable a first power signal to charge a second connection terminal of the storage module through the drive module and the threshold compensation module until a potential difference between the second connection terminal of the storage module and a third connection terminal of the storage module is equal to a threshold voltage of the drive module, and the drive module is switched off; the storage module stores the threshold voltage

S120

In S130, in a data write stage, the data write module is switched on in response to a third control signal to write a data signal to the first connection terminal of the storage module; the storage module couples the potential change of the first connection terminal of the storage module to the second connection terminal of the storage module

S130

In S140, in a light emission stage, the drive module generates a drive current according to a potential of the control terminal of the drive module, and the light emission control module is switched on in response to the light emission control signal to provide a flow path for the drive current to enable the drive current to drive a light-emitting device to emit light

S140

FIG. 15

ARRAY SUBSTRATE, DRIVING METHOD THEREOF, AND DISPLAY PANEL

CROSS-REFERENCE TO RELATED APPLICATIONS

This application is a continuation of International Patent Application No. PCT/CN2023/078152, filed on Feb. 24, 2023, which claims priority to Chinese Patent Application No. 202211161619.1 filed on Sep. 23, 2022, disclosures of both of which are incorporated herein by reference in their entireties.

FIELD

The present application relates to the field of display technology, for example, an array substrate, a driving method thereof, and a display panel.

BACKGROUND

With the continuous development of display technology, the application of display panels ranges more and more widely, and the requirements for display panels become increasingly higher. The array substrate in the display panel plays a very important role in driving the light-emitting diode to emit light stably. The degrees of threshold voltage compensation to the array substrate at grayscales are different from each other. In summary, such display panels are faced with the problems of poor display brightness uniformity, unsatisfactory resolution and a limited refresh rate.

SUMMARY

The present application provides an array substrate, a driving method thereof, and a display panel to improve the display brightness uniformity of the display panel while achieving both high resolution and a high refresh rate of the display panel.

Embodiments of the present application provide the following solutions.

An array substrate includes a drive module, an initialization module, a data write module, a storage module, a threshold compensation module, and a light emission control module.

A first terminal of the drive module is used to receive a first power signal.

A first connection terminal of the storage module is electrically connected to a first output terminal of the initialization module and an output terminal of the data write module, a second connection terminal of the storage module is electrically connected to a control terminal of the drive module, and a third connection terminal of the storage module is used to receive the first power signal. The storage module is configured to store a potential difference between the first connection terminal of the storage module and the second connection terminal of the storage module in an initialization stage, store a threshold voltage of the drive module in a threshold compensation stage, and couple a potential change of the first connection terminal of the storage module to the second connection terminal of the storage module in a data write stage.

A first terminal of the light emission control module is electrically connected to a second terminal of the drive module, and a second terminal of the light emission control module is electrically connected to a first electrode of a light-emitting diode. The light emission control module is configured to be switched on in response to a light emission control signal in the initialization stage and a light emission stage.

A second output terminal of the initialization module is electrically connected to the second terminal of the light emission control module. The initialization module is configured to transmit, in response to a first control signal, a first initialization signal to the first connection terminal of the storage module in the initialization stage and the threshold compensation stage and transmit, in response to a second control signal, a second initialization signal to the first electrode of the light-emitting diode in the initialization stage.

The threshold compensation module is electrically connected to the control terminal of the drive module and the second terminal of the drive module. The threshold compensation module is configured to be, in response to the first control signal, switched on in the initialization stage to cooperate with the initialization module and the light emission control module to transmit the second initialization signal to the control terminal of the drive module and switched on in the threshold compensation stage to enable the first power signal to charge the second connection terminal of the storage module through the drive module and the threshold compensation module.

The data write module is configured to be, in response to a third control signal, switched on in the data write stage to write a data signal to the first connection terminal of the storage module.

The third control signal and the first control signal are provided by different groups of scan circuits.

The present application further provides a display panel. The display panel includes the array substrate provided by any embodiment of the present application.

The present application further provides a driving method of an array substrate. The driving method is used for driving the array substrate provided by any embodiment of the present application and includes the following steps.

In an initialization stage, the initialization module transmits, in response to the first control signal, the first initialization signal to the first connection terminal of the storage module; the initialization module transmits, in response to the second control signal, the second initialization signal to the second terminal of the light emission control module; the light emission control module is switched on in response to the light emission control signal and the threshold compensation module is switched on in response to the first control signal to enable the second initialization signal to be transmitted to the control terminal of the drive module; the storage module stores a potential difference between the first initialization signal and the second initialization signal.

In a threshold compensation stage, the threshold compensation module is switched on in response to the first control signal to enable the first power signal to charge the second connection terminal of the storage module through the drive module and the threshold compensation module until a potential difference between the second connection terminal of the storage module and the third connection terminal of the storage module is equal to a threshold voltage of the drive module, and the drive module is switched off; the storage module stores the threshold voltage.

In a data write stage, the data write module is switched on in response to the third control signal to write the data signal to the first connection terminal of the storage module; the storage module couples the potential change of the first connection terminal of the storage module to the second connection terminal of the storage module.

In a light emission stage, the drive module generates a drive current according to a potential of the control terminal of the drive module, and the light emission control module is switched on in response to the light emission control signal to provide a flow path for the drive current to enable the drive current to drive the light-emitting diode to emit light.

The array substrate provided by the embodiments of the present application is provided with a drive module, an initialization module, a data write module, a storage module, a threshold compensation module, and a light emission control module, and the threshold compensation stage is set separately from the data write stage. In this manner, firstly, the threshold compensation process is controlled only by the second initialization signal and the first power signal and is independent of the size of the data signal, the bias of the drive module is not affected by changes in greyscales, and the threshold compensation effect of the drive module is uniform in all greyscales, thereby improving the display uniformity. Secondly, the data write process and the threshold compensation process are separated from each other, the data signal acts only in the data write stage, the existence of time overlapping in the threshold compensation stage of different rows of pixel circuits does not affect the data write effect, and the threshold compensation stage can be lengthened without being limited by the data write row time, thereby achieving a better compensation effect. Moreover, in the present application, the data writing is implemented by providing a potential jump to the first connection terminal of the storage module, and in fact, the value of the data signal at the end of the pulse of the third control signal determines the potential of the first connection terminal of the storage module in the data write stage. In this manner, as long as the end time of the pulse of the third control signal in different rows of pixel circuits is not the same, the data signals of different rows can be written correctly. In comparison to the case where the data write time of each row of pixel circuits does not overlap and the data writing is performed only after the threshold compensation is completed, in the embodiments of the present application, the data write time of a single row can be shortened, and the data write time of different rows is allowed to overlap, thereby achieving a high refresh rate and providing conditions for the implementation of the display panel with high resolution. Therefore, the embodiments of the present application can improve the display brightness uniformity of the display panel and achieve both high resolution and a high refresh rate of the display panel.

BRIEF DESCRIPTION OF DRAWINGS

FIG. 15 is a flowchart of a driving method of an array substrate according to an embodiment of the present application.

DETAILED DESCRIPTION

Figure 1:
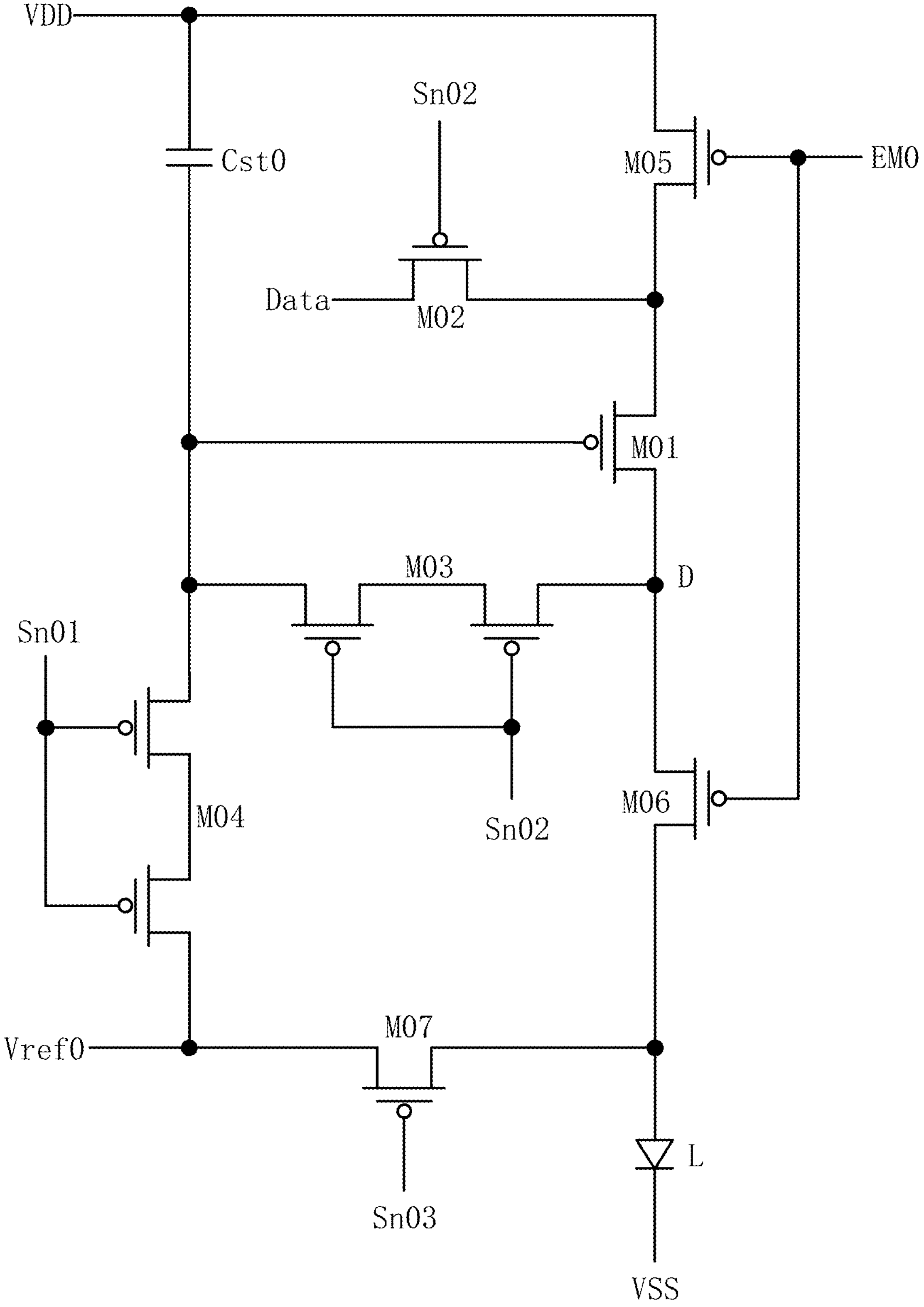
FIG. 1 is a structure diagram of an array substrate.

In general, data writing and threshold voltage compensation are performed in the same stage during the driving process of an array substrate, resulting in poor display brightness uniformity and limited resolution and refresh rate of the display panel. The causes of the above-mentioned problems will be explained below in conjunction with FIG. 1. FIG. 1 shows an array substrate having 7T1C architecture. With reference to FIG. 1, the array substrate includes a transistor M01, a transistor M02, a transistor M03, a transistor M04, a transistor M05, a transistor M06, a transistor M07, and a storage capacitor Cst0. For example, the transistors are all P-type transistors and are fabricated by using a low-temperature polycrystalline silicon (LTPS) technique. The signals to be received into the array substrate include a first power signal VDD, a second power signal VSS, an initialization signal Vref0, a data signal Data, a scan signal Sn01, a scan signal Sn02, a scan signal Sn03, and a light emission control signal EM0. The driving process of the array substrate includes an initialization stage, a data write and compensation stage, and a light emission stage. The data write and compensation stage of the array substrate will be mainly described below.

In the array substrate, the transistor M01 serves as a drive transistor, and a gate potential of the transistor M01 is stored by the storage capacitor Cst0; the transistor M02 serves as a data write transistor, the transistor M03 serves as a threshold compensation transistor, and the gates of the transistor M02 and the transistor M03 receive the scan signal Sn02. In the data write and compensation stage, the scan signal Sn02 is a low-potential signal, the transistor M02 and the transistor M03 are both on, the data signal Data is transmitted to the gate of transistor M01 through the transistor M02, the first and second electrodes of the transistor M01, and the transistor M03, and at the same time, the storage capacitor Cst0 is charged. The objective of the above-mentioned process is to correctly store the information containing the data signal Data and the threshold voltage Vth of the transistor M01 using the storage capacitor Cst0. In this manner, the process needs to wait at least until the gate of the transistor M01 is charged to Data+Vth and turned off, which limits the data write speed of the array substrate, and when the row time is small and the gate potential of the transistor M01 fails to reach Data+Vth, the stage ends prematurely, causing a poor compensation effect. In addition, different potentials of the data signal Data in different grayscales cause the difference in the compensation to the transistor M01 in different grayscales. In other words, the threshold voltage compensation effect in the general array substrate is affected by both the duration of data writing and the size of the potential of the data signal (the size of the greyscale), and the compensation effect is poor. Moreover, in order to ensure the threshold compensation effect, the duration of data writing needs to be set longer, which causes the refresh rate of the display panel to be limited; in the case of the limited refresh rate, even if the layout and preparation technique of the array substrate can meet the requirements of high resolution, the resolution is still limited due to the driving process failing to meet the requirements.

Figure 2:
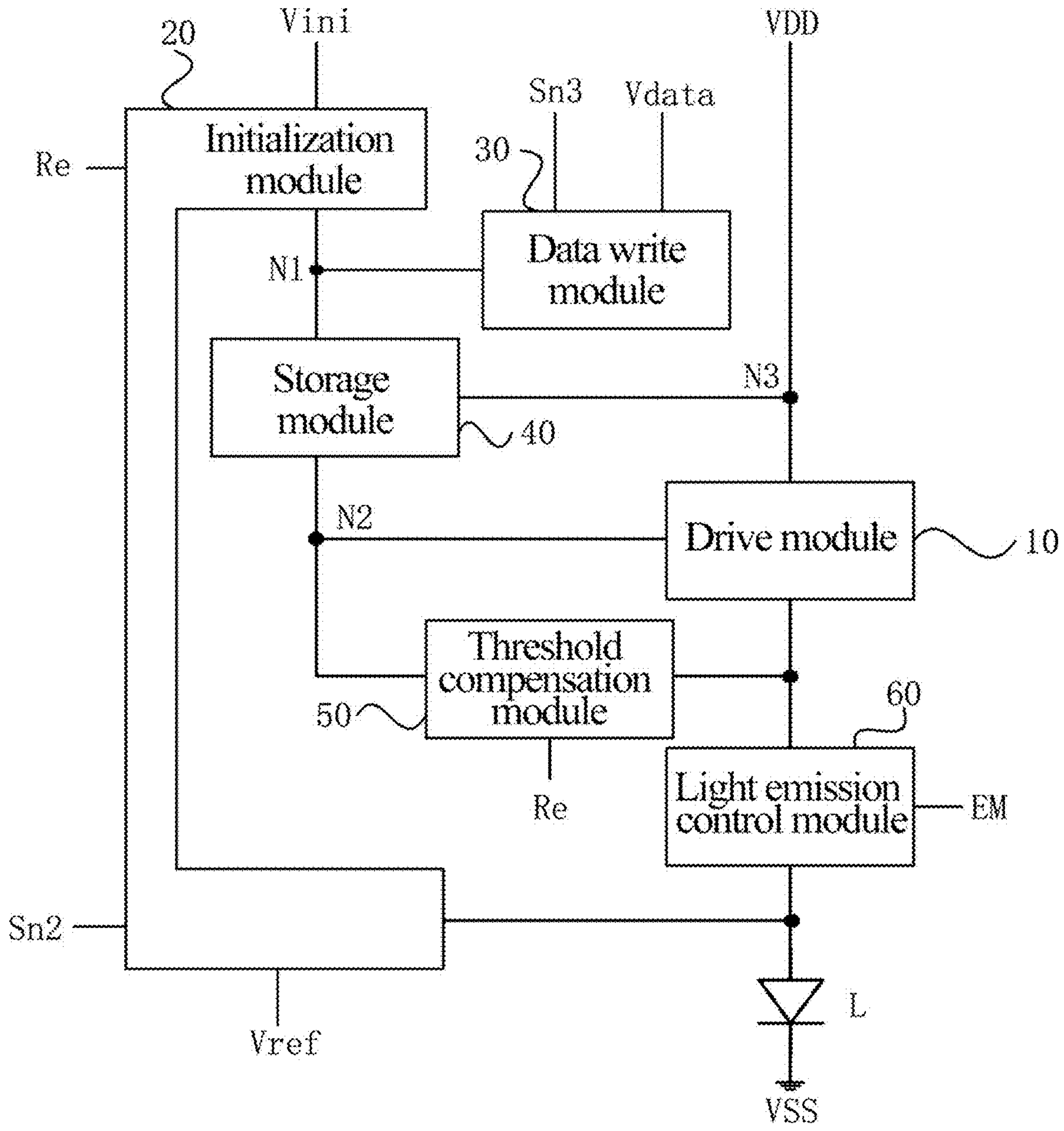
FIG. 2 is a structure diagram of an array substrate according to an embodiment of the present application.

To solve the above-mentioned problems, the embodiments of the present application provide a new array substrate. FIG. 2 is a structure diagram of an array substrate according to an embodiment of the present application. With reference to FIG. 2, the array substrate includes a drive module 10, an initialization module 20, a data write module 30, a storage module 40, a threshold compensation module 50, and a light emission control module 60. The array substrate includes multiple pixel circuits.

The drive module 10 includes a control terminal, a first terminal, and a second terminal, and the first terminal of the drive module 10 is used to receive a first power signal VDD. The drive module 10 is configured to generate a drive current according to a potential of the control terminal of the drive module 10 and a potential of the first terminal of the drive module 10. The storage module 40 includes a first connection terminal N1, a second connection terminal N2, and a third connection terminal N3. The first connection terminal N1 of the storage module 40 is electrically connected to the initialization module 20 and the data write module 30, the second connection terminal N2 is electrically connected to the control terminal of the drive module 10, and the third connection terminal N3 is used to receive the first power signal VDD. The initialization module 20 includes a first control terminal, a second control terminal, a first input terminal, a second input terminal, a first output terminal, and a second output terminal. The first control terminal of the initialization module 20 is used to receive a first control signal Re, the first input terminal of the initialization module 20 is used to receive a first initialization signal Vini, the first output terminal of the initialization module 20 is electrically connected to the first connection terminal N1 of the storage module 40, the second control terminal of the initialization module 20 is used to receive a second control signal Sn2, the second input terminal of the initialization module 20 is used to receive a second initialization signal Vref, and the second output terminal of the initialization module 20 is electrically connected to a first electrode of a light-emitting diode L. The initialization module 20 is configured to control, according to the first control signal Re, whether the first input terminal and the first output terminal of the initialization module 20 are switched on, and control, according to the second control signal Sn2, whether the second input terminal and the second output terminal of the initialization module 20 are switched on. The threshold compensation module 50 includes a control terminal, a first terminal, and a second terminal. The control terminal of the threshold compensation module 50 is used to receive the first control signal Re, the first terminal of the threshold compensation module 50 is electrically connected to the second terminal of the drive module 10, and the second terminal of the threshold compensation module 50 is electrically connected to the control terminal of the drive module 10. The threshold compensation module 50 is configured to control, according to the first control signal Re, whether the second terminal and the control terminal of the drive module 10 are switched on. The data write module 30 includes a control terminal, an input terminal, and an output terminal. The control terminal of the data write module 30 is used to receive a third control signal Sn3, the input terminal of the data write module 30 is used to receive a data signal Vdata, and the output terminal of the data write module 30 is electrically connected to the first connection terminal N1 of the storage module 40. The data write module 30 is configured to control, according to the third control signal Sn3, whether the input terminal and the output terminal of the data write module 30 are switched on. The light emission control module 60 includes a control terminal, a first terminal, and a second terminal. The control terminal of the light emission control module 60 is used to receive a light emission control signal EM, the first terminal of the light emission control module 60 is electrically connected to the second terminal of the drive module 10, the second terminal of the light emission control module 60 is electrically connected to the first electrode of the light-emitting diode L, and a second electrode of the light-emitting diode L is used to receive a second power signal VSS. The light emission control module 60 is configured to control, according to the light emission control signal EM, whether the first terminal and the second terminal of the light emission control module 60 are switched on.

For example, the drive module 10 includes a drive transistor, and the threshold voltage of the drive transistor is the threshold voltage of the drive module 10. The first electrode of the light-emitting diode L is an anode, and the second electrode of the light-emitting diode L is a cathode. The first power signal VDD, the second power signal VSS, the first initialization signal Vini, and the second initialization signal Vref are all direct current voltage signals and are provided by a power supply chip or a driver chip in the display panel. The first power signal VDD and the first initialization signal Vini are positive voltage signals, and the second power signal VSS and the second initialization signal Vref are negative voltage signals. The first control signal Re, the second control signal Sn2, the third control signal Sn3, and the light emission control signal EM are all scan signals with alternating positive and negative potentials alternately and are provided by a scan circuit disposed in the bezel of the display panel.

Figure 3:
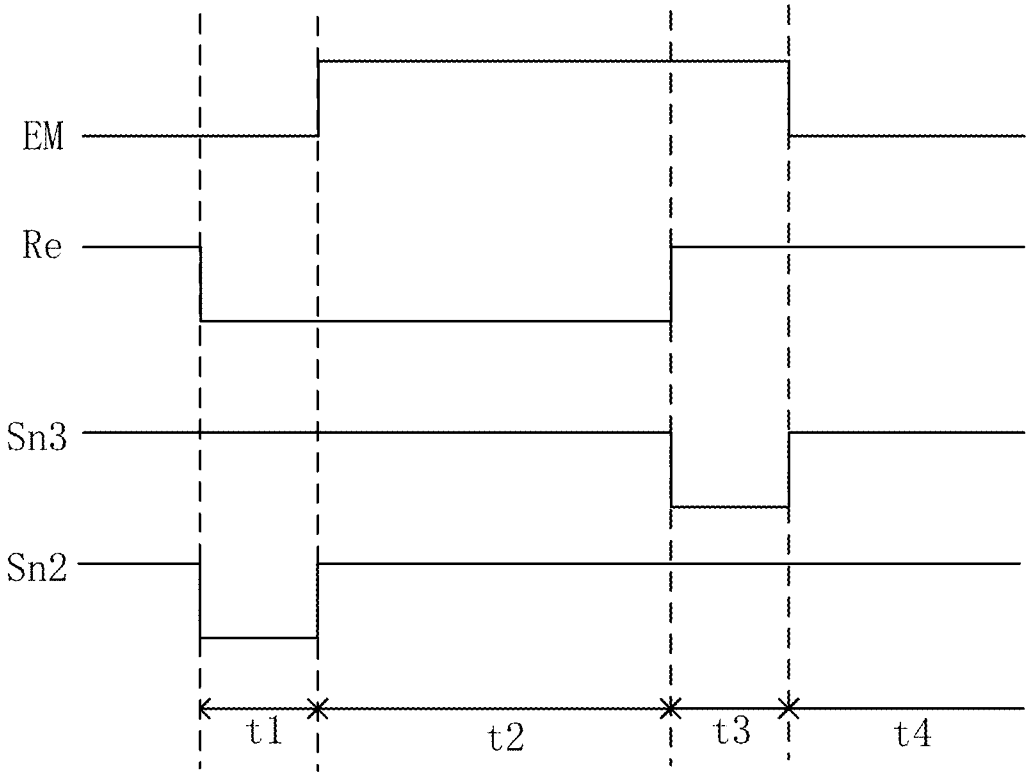
FIG. 3 is a drive timing diagram of an array substrate according to an embodiment of the present application.

FIG. 3 is a drive timing diagram of an array substrate according to an embodiment of the present application. With reference to FIG. 3, the driving process of the array substrate includes an initialization stage t1, a threshold compensation stage t2, a data write stage t3, and a light emission stage t4. The driving process of the array substrate will be described below by using an example in which each function module responds to a control signal with a low potential. In conjunction with FIGS. 2 and 3, the driving process of the array substrate includes an initialization stage t1, a threshold compensation stage t2, a data write stage t3, and a light emission stage t4.

In the initialization stage t1, the first control signal Re, the second control signal Sn2, and the light emission control signal EM are all low-potential signals, and the third control signal Sn3 is a high-potential signal. The initialization module 20 controls, in response to the first control signal Re, the first input terminal and the first output terminal of the initialization module 20 to be switched on and transmits the first initialization signal Vini to the first connection terminal N1 of the storage module 40. At the same time, the initialization module 20 controls, in response to the second control signal Sn2, the second input terminal and the second output terminal of the initialization module 20 to be switched on and transmits the second initialization signal Vref to the second terminal (the first electrode of the light-emitting diode L) of the light emission control module 60; the second initialization signal Vref resets the first electrode of the light-emitting diode L. The light emission control module 60 is switched on in response to the light emission control signal EM and the threshold compensation module 50 is switched on in response to the first control signal Re to enable the second initialization signal Vref to be transmitted to the control terminal of the drive module 10. At this point, the storage module 40 stores a potential difference between the first connection terminal N1 of the storage module 40 and the second connection terminal N2 of the storage module 40, that is, the storage module 40 stores a potential difference between the first initialization signal Vini and the second initialization signal Vref.

In the threshold compensation stage t2, the first control signal Re is a low-potential signal, and the second control signal Sn2, the third control signal Sn3, and the light emission control signal EM are all high-potential signals. The threshold compensation module 50 is switched on in response to the first control signal Re, the control terminal of the drive module 10 holds the second initialization signal Vref that is written in the previous stage at the beginning of the threshold compensation stage t2, and the drive module 10 is switched on under the control of a potential difference between the control terminal of the drive module 10 and the first terminal of the drive module 10. The first power signal VDD runs through the first terminal and the second terminal of the drive module 10 and the threshold compensation module 50 and charges the second connection terminal N2 of the storage module 40 until a potential difference between the second connection terminal N2 of the storage module 40 and the third connection terminal N3 of the storage module 40 is equal to the threshold voltage of the drive module 10, that is, when the potential of the control terminal of the drive module 10 is equal to VDD+Vth1, the drive module 10 is switched off, where Vth1 is the threshold voltage of the drive module 10. After the drive module 10 is switched off, the storage module 40 stores the potential difference between the second connection terminal N2 of the storage module 40 and the third connection terminal N3 of the storage module 40, that is, the storage module 40 stores the threshold voltage Vth1.

In the data write stage t3, the third control signal Sn3 is a low-potential signal, and the first control signal Re, the second control signal Sn2, and the light emission control signal EM are all high-potential signals. The data write module is switched on in response to the third control signal Sn3 and writes the data signal Vdata to the first connection terminal N1 of the storage module 40. At this point, the potential of the first connection terminal N1 jumps from the first initialization signal in the previous stage to the data signal Vdata in the current stage, and the storage module 40 couples a potential change of the first connection terminal N1 to the second connection terminal N2, that is, the potential that carries the information on the data signal Vdata is written to the control terminal of the drive module 10. At this point, the potential difference between the second connection terminal N2 of the storage module 40 and the third connection terminal N3 of the storage module 40 carries both the information on the threshold voltage Vth1 and the information on the data signal Vdata.

In the light emission stage t4, the light emission control signal EM is a low-potential signal, and the first control signal Re, the second control signal Sn2, and the third control signal Sn3 are all high-potential signals. The drive module 10 generates a drive current according to a potential difference between the control terminal of the drive module 10 and the first terminal of the drive module 10, and the light emission control module 60 is switched on in response to the light emission control signal EM to provide a flow path for the drive current to enable the drive current to drive the light-emitting diode L to emit light. In this stage, the drive current generated by the drive module 10 is a function of Vgs−Vth1, where Vgs is the potential difference between the control terminal of the drive module 10 and the first terminal of the drive module 10, that is, the potential difference between the second connection terminal N2 of the storage module 40 and the third connection terminal N3 of the storage module 40. Since Vgs carries the information on the threshold voltage Vth1, after the above-mentioned operation, the impact of the threshold voltage Vth1 on the drive current can be eliminated, thereby achieving a threshold compensation effect.

The third control signal Sn3 and the first control signal Re are provided by different groups of scan circuits, that is, the scan circuit for providing the third control signal Sn3 required for each row of pixel circuits and the scan circuit for providing the first control signal Re required for each row of pixel circuits are set in a discrete manner, no cascade relationship or other association control relationship exists between the two types of scan circuits, and the signal generation processes do not affect each other. Therefore, the threshold compensation process and the data write process of the array substrate are completely separated from each other. Specifically, for the same row of pixel circuits, the circuit structure and the drive timing are set and the threshold compensation stage t2 and the data write stage t3 are performed successively without interfering with each other; for different rows of pixel circuits, the discrete setting of scan circuits enables the first control signal Re to be not associated with the third control signal Sn3 so that the threshold compensation stage t2 and the data write stage t3 of different rows of pixel circuits also do not restrict each other due to the association of the control signals, thereby simplifying the control logic of the display panel and providing conditions for the implementation of a high refresh rate of the display panel.

The array substrate provided by the embodiments of the present application is provided with a drive module 10, an initialization module 20, a data write module 30, a storage module 40, a threshold compensation module 50, and a light emission control module 60, and the threshold compensation stage t2 is set separately from the data write stage t3. In this manner, firstly, the threshold compensation process is controlled only by the second initialization signal Vref and the first power signal VDD and is independent of the size of the data signal Vdata, the bias of the drive module 10 is not affected by changes in greyscales, and the threshold compensation effect of the drive module 10 is uniform in all greyscales, thereby improving the display uniformity. Secondly, the data write process and the threshold compensation process are separated from each other, the data signal Vdata acts only in the data write stage t3, the existence of time overlapping in the threshold compensation stage t2 of different rows of pixel circuits does not affect the data write effect, and the threshold compensation stage t2 can be lengthened without being limited by the data write row time, thereby achieving a better compensation effect. Moreover, in the embodiments, the data writing is implemented by providing a potential jump to the first connection terminal N1 of the storage module 40, and in fact, the value of the data signal Vdata at the end of the pulse of the third control signal Sn3 determines the potential of the first connection terminal N1 of the storage module 40 in the data write stage t3. In this manner, as long as the end time of the pulse of the third control signal Sn3 in different rows of pixel circuits is not the same, the data signals of different rows can be written correctly. In comparison to the case where the data write time of each row of pixel circuits does not overlap and the data writing is performed only after the threshold compensation is completed, in the embodiments of the present application, the data write time of a single row can be shortened, and the data write time of different rows is allowed to overlap, thereby achieving a high refresh rate and providing conditions for the implementation of the display panel with high resolution. Therefore, the embodiments of the present application can improve the display brightness uniformity of the display panel and achieve both high resolution and a high refresh rate of the display panel.

On the basis of the embodiments described above, the duration of the threshold compensation stage t2 can be configured by adjusting the pulse width of the first control signal Re. For example, the holding duration of the threshold compensation stage t2 is greater than one row time or even reaches hundreds of row times, thereby greatly extending the threshold compensation time and improving the brightness uniformity. The row time is a holding time for a driver chip to provide a data signal required by one row of pixel circuits.

On the basis of the embodiments described above, the holding time of the data write stage t3 is greater than one row time, thereby improving the drive reliability of the screen with a high refresh rate and high resolution. For the array substrate (shown in FIG. 1), the pulse width of the scan signal Sn02 must be less than one row time to ensure the correct writing of data signals of each row of pixel circuits. In this manner, in a scenario with a high refresh rate, the row time is less than 2 us, the pulse width of the scan signal Sn02 will be smaller, the working reliability of the scan circuit used for providing the scan signal Sn02 will decrease, and the probability that an abnormal display occurs on the display panel will increase. As can be known from the foregoing analysis, for the array substrate provided by the embodiments of the present application, the value of the voltage written to the first connection terminal N1 in the data write stage t3 is determined by the data signal Vdata at the end of the low-potential pulse of the third control signal Sn3. Then, the data signal Vdata is allowed to jump several times during the time of the low-potential pulse of the third control signal Sn3, and the data writing error does not occur. In other words, the array substrate provided by the embodiments of the present application allows the pulse width of the third control signal Sn3 to be greater than one row time, the requirement for the scan circuit used for providing the scan signal of the third control signal Sn3 can be reduced, and the reliability of the scan circuit can be improved, thereby reducing the probability of the occurrence of an abnormal display on the display panel under the driving condition with a high refresh rate and high resolution.

Several structures that the array substrate have will be described below.

Figure 4:
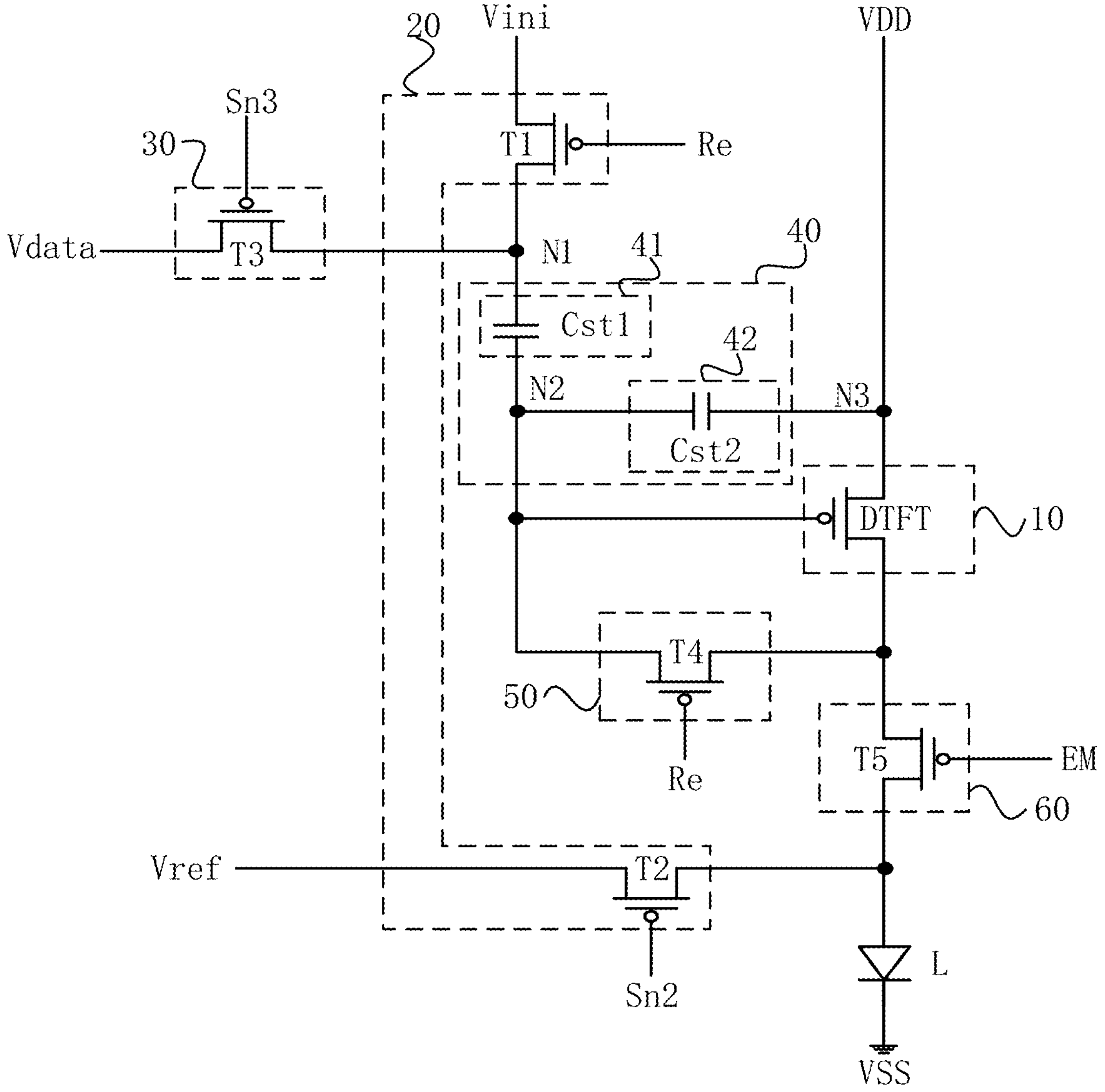
FIG. 4 is a structure diagram of another array substrate according to an embodiment of the present application.

FIG. 4 is a structure diagram of another array substrate according to an embodiment of the present application. With reference to FIG. 4, in one embodiment, the drive module 10 includes a drive transistor DTFT. A control electrode of the drive transistor DTFT serves as the control terminal of the drive module 10, a first electrode of the drive transistor DTFT serves as the first terminal of the drive module 10, and a second electrode of the drive transistor DTFT serves as the second terminal of the drive module 10. In the embodiment, the drive module 10 is set to be composed of a single transistor, making the structure of the array substrate simple and easy to implement.

With continued reference to FIG. 4, in one embodiment, the storage module 40 includes a first storage unit 41 and a second storage unit 42. The first storage unit 41 is connected between the first connection terminal N1 of the storage module 40 and the second connection terminal N2 of the storage module 40. The first storage unit 41 is configured to store the potential difference between the first connection terminal N1 and the second connection terminal N2 in the initialization stage and couple the potential change of the first connection terminal N1 to the second connection terminal N2 in the data write stage. The second storage unit 42 is connected between the second connection terminal N2 of the storage module 40 and the third connection terminal N3 of the storage module 40. The second storage unit 42 is configured to store the threshold voltage of the drive module 10 in the threshold compensation stage. In the embodiment, the storage module 40 is set to include two storage units, enabling the storage and coupling control of the potentials of each connection terminal of the storage module 40 to be separately implemented in different driving stages.

For example, the first storage unit 41 includes a first capacitor Cst1. A first terminal of the first capacitor Cst1 is electrically connected to the first connection terminal N1, and a second terminal of the first capacitor Cst1 is electrically connected to the second connection terminal N2. The second storage unit 42 includes a second capacitor Cst2. A first terminal of the second capacitor Cst2 is electrically connected to the second connection terminal N2, and a second terminal of the second capacitor Cst2 is electrically connected to the third connection terminal N3. In the embodiment, each storage unit is set to be composed of a single capacitor, making the structure of the array substrate simple and easy to implement.

With continued reference to FIG. 4, in one embodiment, the initialization module 20 includes a first transistor T1 and a second transistor T2. A first electrode of the first transistor T1 is used to receive the first initialization signal Vini, a second electrode of the first transistor T1 is electrically connected to the first connection terminal N1 of the storage module 40, and a control electrode of the first transistor T1 is used to receive the first control signal Re. A first electrode of the second transistor T2 is used to receive the second initialization signal Vref, a second electrode of the second transistor T2 is electrically connected to the second terminal of the light emission control module 60, and a control electrode of the second transistor T2 is used to receive the second control signal Sn2. The first transistor T1 is configured to control, according to the first control signal Re, whether the first initialization signal Vini is transmitted to the first connection terminal N1 of the storage module 40, and the second transistor T2 is configured to control, according to the second control signal Sn2, whether the second initialization signal Vref is transmitted to the second terminal of the light emission control module 60.

With continued reference to FIG. 4, in one embodiment, the data write module 30 includes a third transistor T3. A first electrode of the third transistor T3 is used to receive the data signal Vdata, a second electrode of the third transistor T3 is electrically connected to the first connection terminal N1, and a control electrode of the third transistor T3 is used to receive the third control signal Sn3, the data write module 30 is set to be composed of a single transistor, making the structure of the array substrate simple and easy to implement.

With continued reference to FIG. 4, in one embodiment, the threshold compensation module 50 includes a fourth transistor T4. A first electrode of the fourth transistor T4 is electrically connected to the second electrode of the drive transistor DTFT, a second electrode of the fourth transistor T4 is electrically connected to the control electrode of the drive transistor DTFT, and a control electrode of the fourth transistor T4 is used to receive the first control signal Re. In the embodiment, the threshold compensation module 50 is set to be composed of a single transistor, making the structure of the array substrate simple and easy to implement.

With continued reference to FIG. 4, in one embodiment, the light emission control module 60 includes a fifth transistor T5. A first electrode of the fifth transistor T5 is electrically connected to the second electrode of the drive transistor DTFT, a second electrode of the fifth transistor T5 is electrically connected to the first electrode of the light-emitting diode L, and a control electrode of the fifth transistor T5 is used to receive the light emission control signal EM. In the embodiment, the light emission control module 60 is set to be composed of a single transistor, making the structure of the array substrate simple and easy to implement.

In summary, the embodiments of the present application provide an array substrate architecture of 6T2C. For example, the transistors in the array substrate are P-type transistors and are fabricated by using the LTPS process to reduce the preparation cost of the display panel.

In conjunction with FIGS. 4 and 3, the driving process of the array substrate is described below. The driving process of the array substrate includes an initialization stage t1, a threshold compensation stage t2, a data write stage t3, and a light emission stage t4.

In the initialization stage t1, the first control signal Re, the second control signal Sn2, and the light emission control signal EM are all low-potential signals, and the third control signal Sn3 is a high-potential signal. The first transistor T1, the second transistor T2, the fourth transistor T4, and the fifth transistor T5 are all on. The first initialization signal Vini is transmitted to the first terminal of the first capacitor Cst1 (that is, the first connection terminal N1) through the first transistor T1. At the same time, the second initialization signal Vref is transmitted to the first electrode of the light-emitting diode L through the second transistor T2 and continues to be transmitted to the control electrode of the drive transistor DTFT (that is, the second connection terminal N2) through the fifth transistor T5 and the fourth transistor T4. In this stage, both the first capacitor Cst1 and the second capacitor Cst2 are both discharged and reset, and the first electrode of the light-emitting diode L is also reset.

In the threshold compensation stage t2, the first control signal Re is a low-potential signal, and the second control signal Sn2, the third control signal Sn3, and the light emission control signal EM are all high-potential signals. The second transistor T2 and the fifth transistor T5 are off, and the first transistor T1 and the fourth transistor T4 remain on. The first power signal VDD charges the second capacitor Cst2 through the first electrode and the second electrode of the drive transistor DTFT and the fourth transistor T4 until the voltage difference across the second capacitor Cst2 reaches the threshold voltage of the drive transistor DTFT, and the potential of the second connection terminal N2 is VDD+Vth1.

In the data write stage t2, the third control signal Sn3 is a low-potential signal, and the first control signal Re, the second control signal Sn2, and the light emission control signal EM are all high-potential signals. The first transistor T1 and the fourth transistor T4 are off, the third transistor T3 is on, and the data signal Vdata is written to the first terminal of the first capacitor Cst1 through the third transistor T3 so that the potential of the first connection terminal N1 jumps from the first initialization signal Vini to the data signal Vdata. Based on the characteristic that the voltage across the first capacitor Cst1 cannot be changed abruptly, the first capacitor Cst1 transmits the potential change of the first terminal of the first capacitor Cst1 to the second terminal of the first capacitor Cst1 so that the potential of the second connection terminal N2 jumps to: VDD+Vth1+(Vdata−Vini)−(Cst1)/(Cst1+Cst2+Cgs), where Cgs is the parasitic capacitance between the control electrode of the drive transistor DTFT and the first electrode of the drive transistor DTFT. Then, the voltage difference across the second capacitor Cst2 changes to Vth1+(Vdata−Vini)−(Cst1)/(Cst1+Cst2+Cgs).

In the light emission stage t4, the light emission control signal EM is a low-potential signal, and the first control signal Re, the second control signal Sn2, and the third control signal Sn3 are all high-potential signals. The third transistor T3 is off, the fifth transistor T5 is on, and the drive transistor DTFT generates a drive current to illuminate the light-emitting diode L. The drive current is a function of Vgs−Vth1, where Vgs is equal to the voltage difference across the second capacitor Cst2. When the structure of the array substrate is determined, the first capacitor Cst1, the second first capacitor Cst2, and Cgs are subsequently determined to be constant values, and in this manner, in practice, the drive current is a function of Vdata−Vini, that is, the magnitude of the drive current is independent of the threshold voltage Vth1 of the drive transistor DTFT, thereby achieving the threshold compensation.

The above embodiments provide a drive timing (as shown in FIG. 3) of the array substrate by way of example only, but are not intended to limit the present application. In other embodiments, the array substrate further is driven by using other drive timings.

Figure 5:
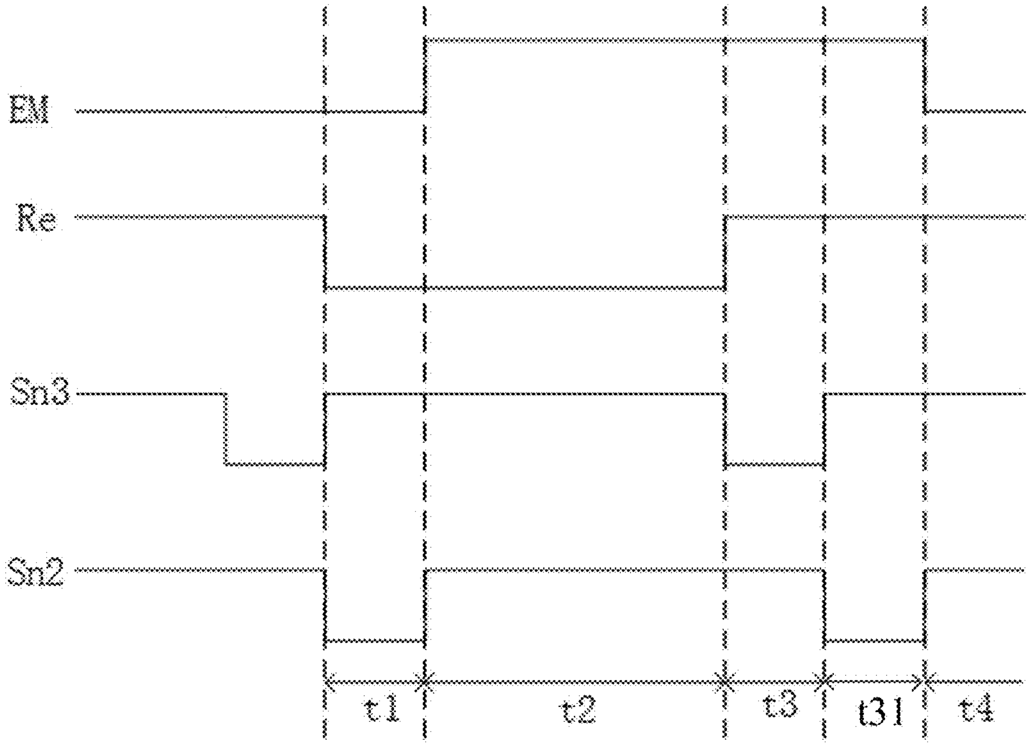
FIG. 5 is a drive timing diagram of another array substrate according to an embodiment of the present application.

FIG. 5 is structure diagram of another array substrate according to an embodiment of the present application, and the drive timing shown in FIG. 5 is also applicable to the array substrate shown in FIG. 4. With reference to FIG. 5, in one embodiment, the second control signal Sn2 and the third control signal Sn3 have the same pulse shapes and pulse intervals so that the second control signal Sn2 and the third control signal Sn3 are not necessarily provided using two groups of scan circuits, but instead they can be provided by cascaded first scan circuits in different stages in the same group, as long as it is ensured that the second control signal Sn2 is provided by the first scan circuit in the next stage of the first scan circuit used for outputting the third control signal Sn3. To ensure that the pulse shapes and pulse intervals of the second control signal Sn2 and the third control signal Sn3 are the same, the second control signal Sn2 has a low potential stage t31 between the data write stage t3 and the light emission stage t4, and the array substrate can normally drive the light-emitting diode L to emit light as long as the high potential holding time of the light emission control signal EM covers the low potential holding time of the second control signal Sn2 in the low-potential stage t31. With this setting, the number of scan circuits can be reduced, thereby achieving a narrow bezel.

Figure 6:
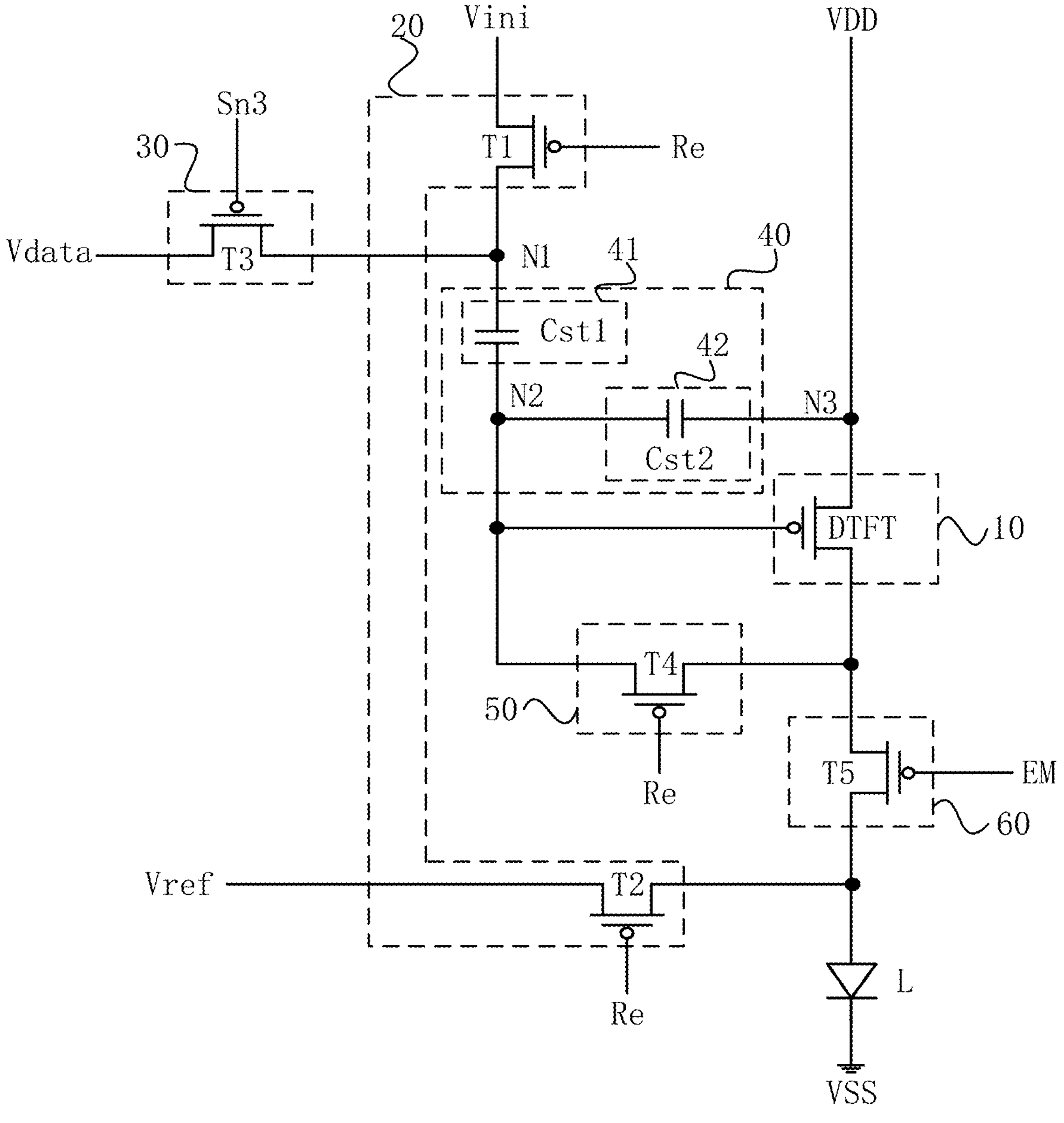
FIG. 6 is a structure diagram of another array substrate according to an embodiment of the present application.

FIG. 6 is a structure diagram of another array substrate according to an embodiment of the present application. With reference to FIG. 6, the array substrate differs from that in FIG. 4 in that the first control signal Re is reused as the second control signal Sn2, that is, the control electrode of the second transistor T2 also is used to receive the first control signal Re. With this setting, the number of control signals required for the array substrate can be effectively reduced, and the number of control signal lines can be reduced, thereby simplifying the wiring of the display panel. Only three scan lines are required to drive a single array substrate, and the parasitic capacitance generated due to signal line overlapping and other reasons is reduced, thereby achieving high-refresh-rate and high-resolution applications.

Figure 7:
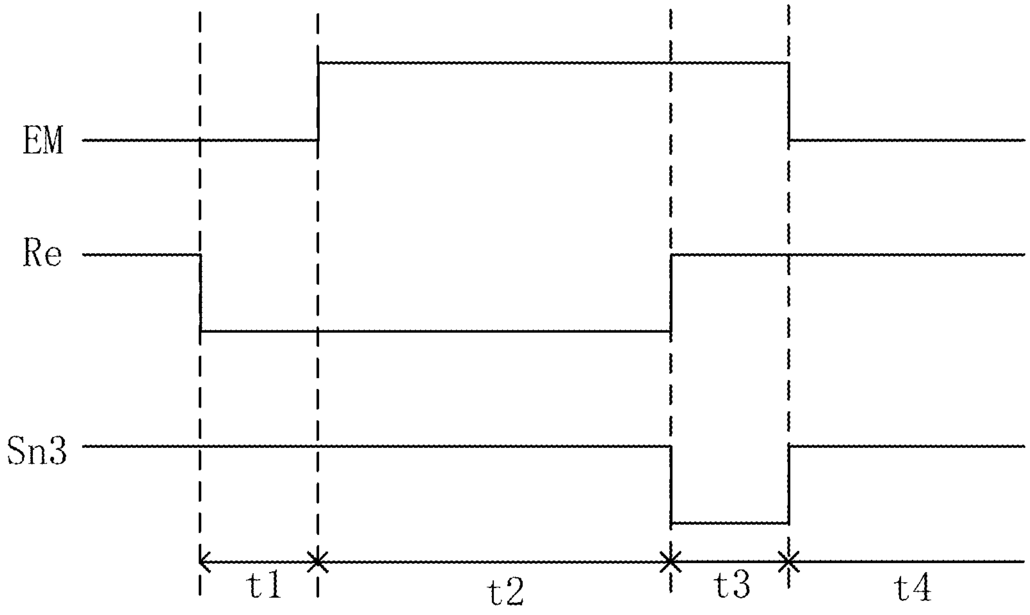
FIG. 7 is a drive timing diagram of another array substrate according to an embodiment of the present application.

FIG. 7 is a drive timing diagram of another array substrate according to an embodiment of the present application. In conjunction with FIGS. 7 and 6, the driving process of the array substrate also includes four stages: an initialization stage t1, a threshold compensation stage t2, a data write stage t3, and a light emission stage t4, and the difference with the driving process of the array substrate shown in FIG. 3 and FIG. 4 lies in that, in the threshold compensation stage t2, the second transistor T2 remains on to continually reset the first electrode of the light-emitting diode L. However, since the fifth transistor T5 is off, the second initialization signal Vref cannot be transmitted to the drive transistor DTFT, without affecting the normal operation of the threshold compensation process.

The above embodiments provide the array substrates all composed of P-type transistors by way of example only, but are not intended to limit the present application. In other embodiments, some or all of the transistors in the array substrate are replaced with N-type transistors as desired, and several settings and beneficial effects thereof will be described below.

In one embodiment, the channel type of the fourth transistor T4 is the same as the channel type of the first transistor T1 and is different from the channel type of the fifth transistor T5. Since the fourth transistor T4 and the first transistor T1 are both controlled by the first control signal Re, setting the channel types of the two to be the same can ensure that the driving process of the array substrate is normally performed. As can be seen from the drive timing of the array substrate in FIGS. 3 and 7, the light emission control signal EM and the first control signal Re are actually a pair of control signals having the same pulse width but opposite potentials. Setting the channel type of the fourth transistor T4 to be different from the channel type of the fifth transistor T5 can cause one of the light emission control signal EM or the first control signal Re to be inverted, and then the light emission control signal EM and the first control signal Re can be provided by cascaded second scan circuits in different stages in the same group. The first control signal Re is provided by the second scan circuit in the previous stage of the second scan circuit used for outputting the light emission control signal EM. With this setting, the number of groups of scan circuits disposed at the bezel of the display panel is reduced, thereby achieving a narrow bezel design. When the second transistor T2 also is used to receive the first control signal Re, setting the second transistor T2 and the fourth transistor T4 to have the same channel type can ensure the normal operation of the circuit.

Figure 8:
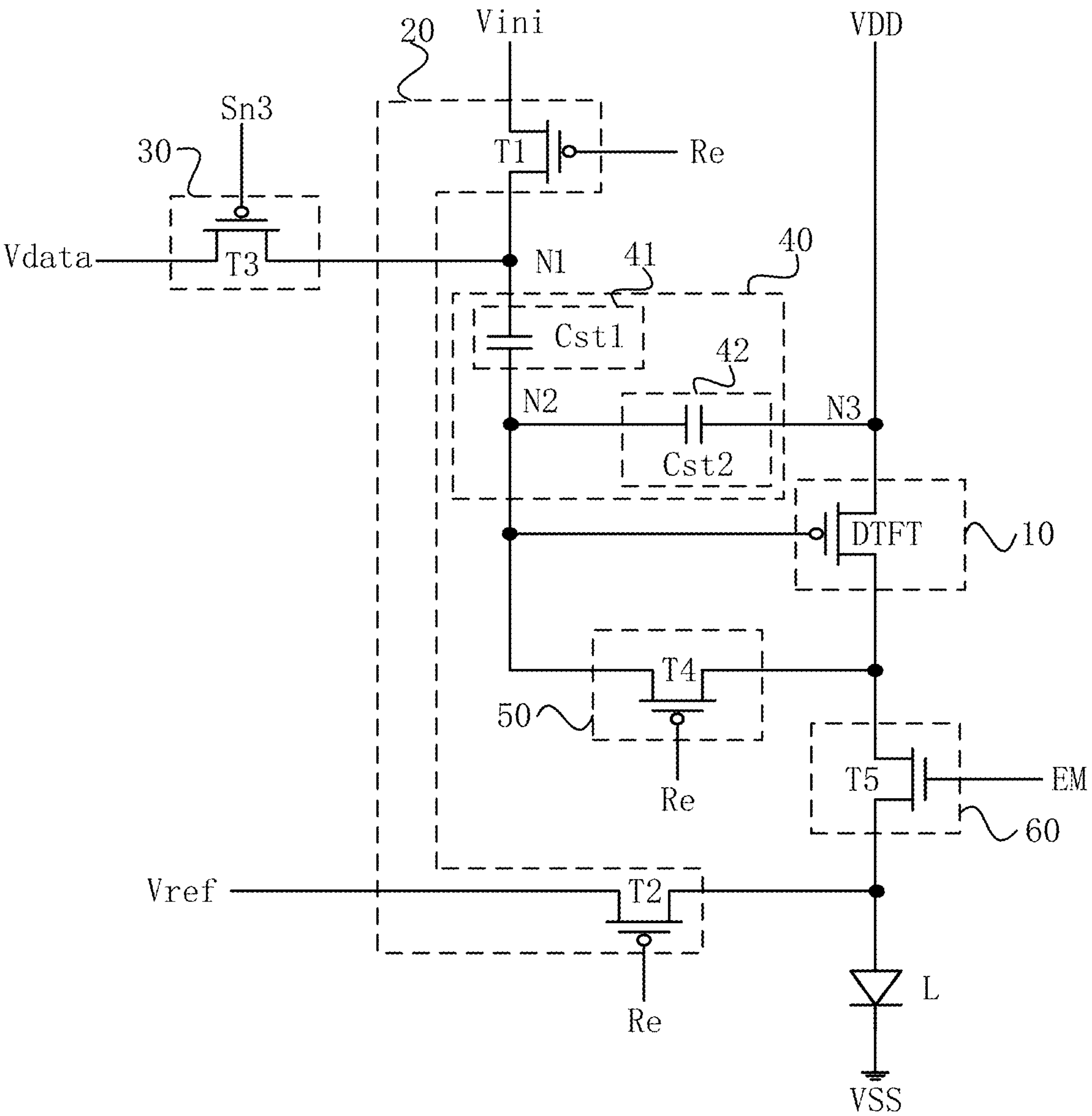
FIG. 8 is a structure diagram of another array substrate according to an embodiment of the present application.
Figure 9:
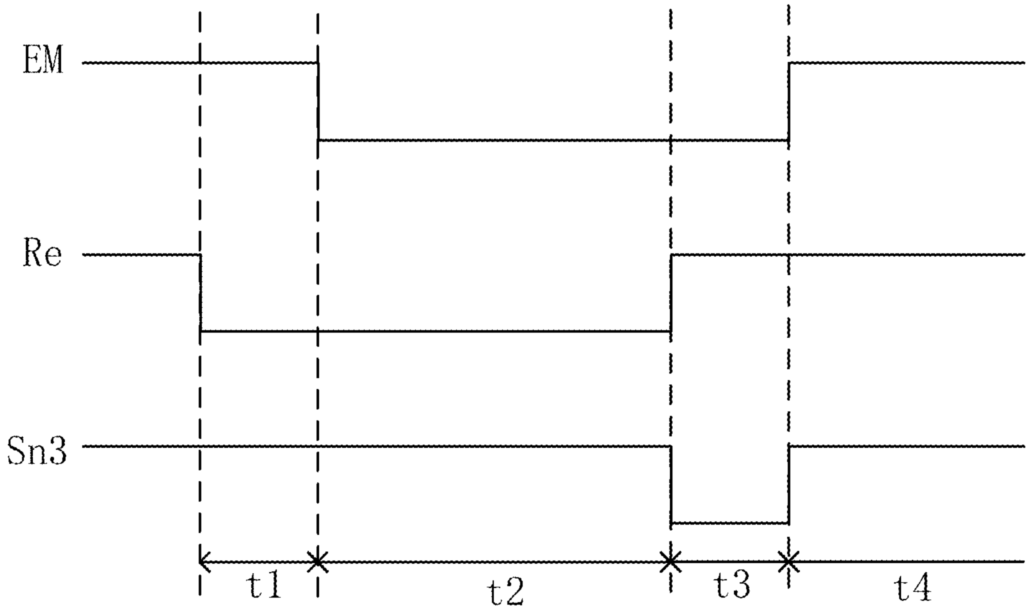
FIG. 9 is a drive timing diagram of another array substrate according to an embodiment of the present application.

FIG. 8 is a structure diagram of another array substrate according to an embodiment of the present application. With reference to FIG. 8, in one embodiment, the fifth transistor T5 is an N-type transistor, and other transistors are P-type transistors. The corresponding drive timing can be seen in FIG. 9, and as can be seen from the comparison between FIG. 9 and FIG. 7, the pulse of the light emission control signal EM is inverted after the fifth transistor T5 is replaced with an N-type transistor.

Figure 10:
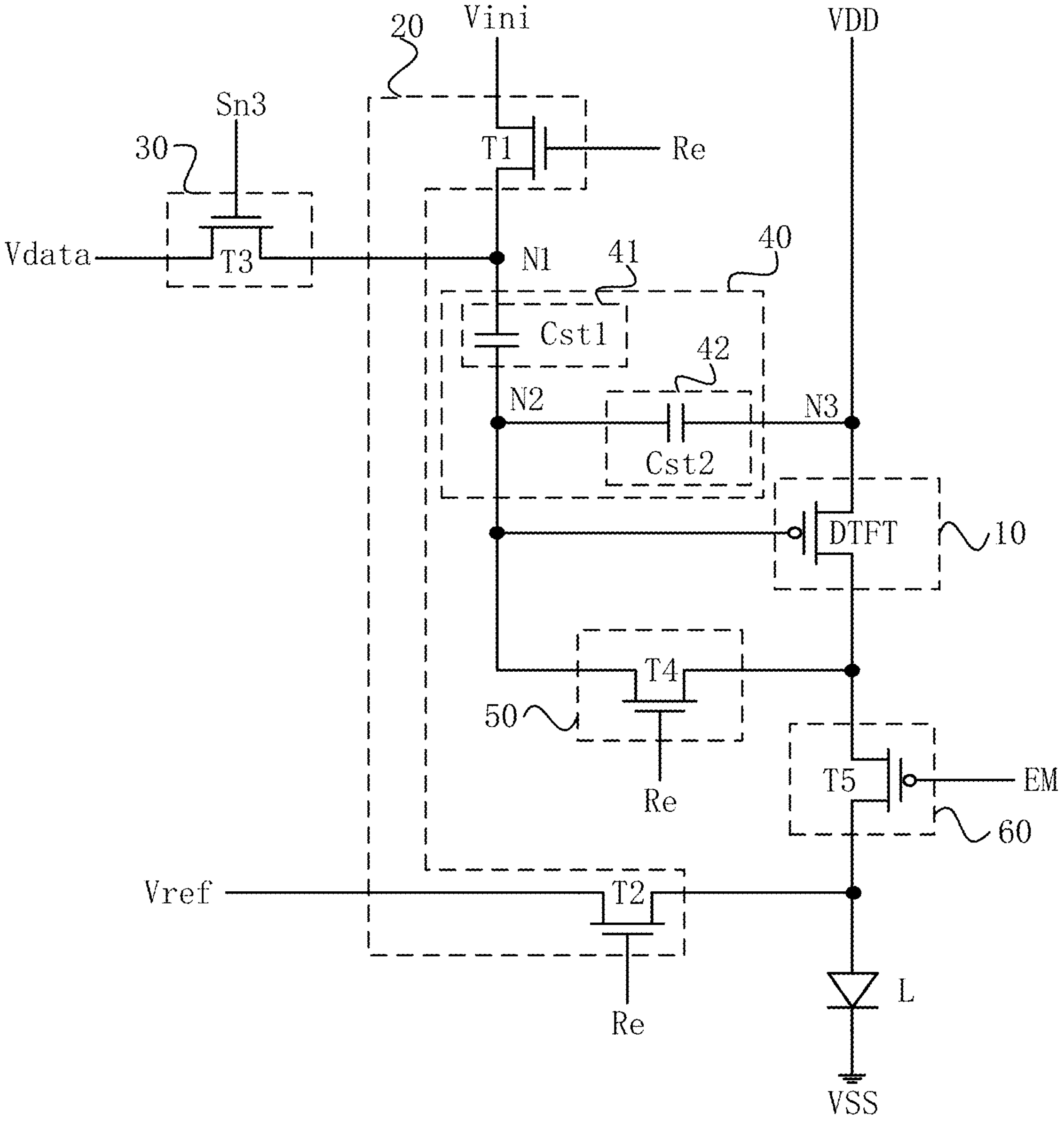
FIG. 10 is a structure diagram of another array substrate according to an embodiment of the present application.
Figure 11:
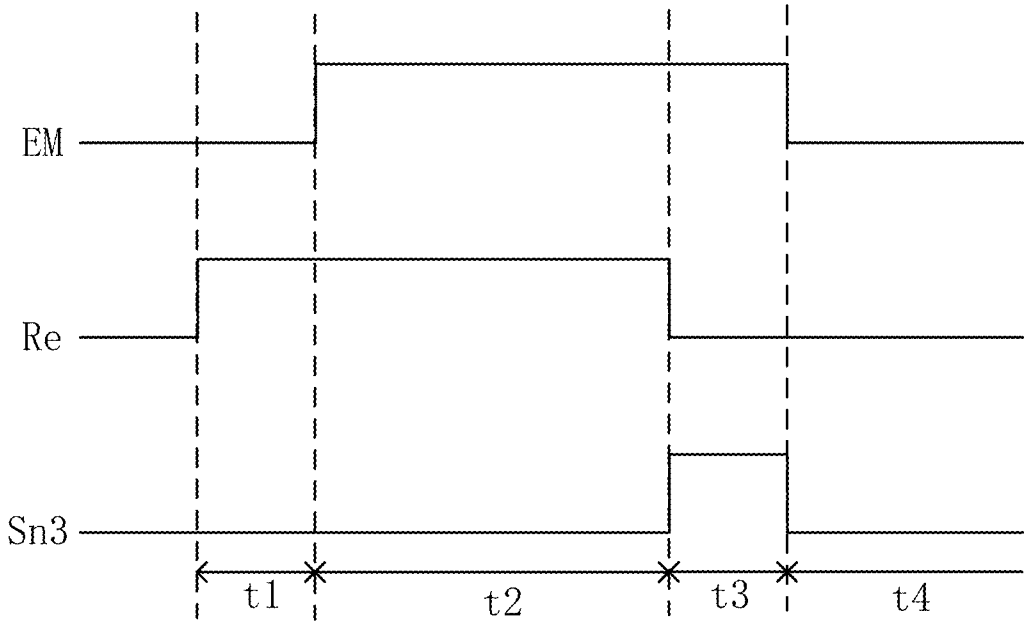
FIG. 11 is a drive timing diagram of another array substrate according to an embodiment of the present application.

FIG. 10 is a structure diagram of another array substrate according to an embodiment of the present application. With reference to FIG. 10, in one embodiment, the fifth transistor T5 is a P-type transistor, and the first transistor T1, the second transistor T2, and the fourth transistor T4 are N-type transistors. The corresponding drive timing can be seen in FIG. 11, and with reference to FIG. 11, the high potential pulses of the first control signal Re and the light emission control signal EM have the same width and different active times.

With continued reference to FIG. 10, on the basis of the above embodiments, the third transistor T3 is set as an N-type transistor. Accordingly, with reference to FIG. 11, the third control signal Sn3 is also replaced with a high potential pulse. The first transistor T1, the second transistor T2, the third transistor T3, and the fourth transistor T4 are all be N-type indium gallium zinc oxide (IGZO) transistors, and all have the feature of low leakage current, and thus the potential of the control electrode of the drive transistor DTFT can be maintained for a long time, thereby enabling the array substrate to support a low-refresh-rate function.

The above embodiments provide the drive module 10, the initialization module 20, the data write module 30, the storage module 40, the threshold compensation module 50, and the light emission control module 60 in the array substrate by way of example only, but are not intended to limit the present application. In other embodiments, the array substrate further includes other function modules.

Figure 12:
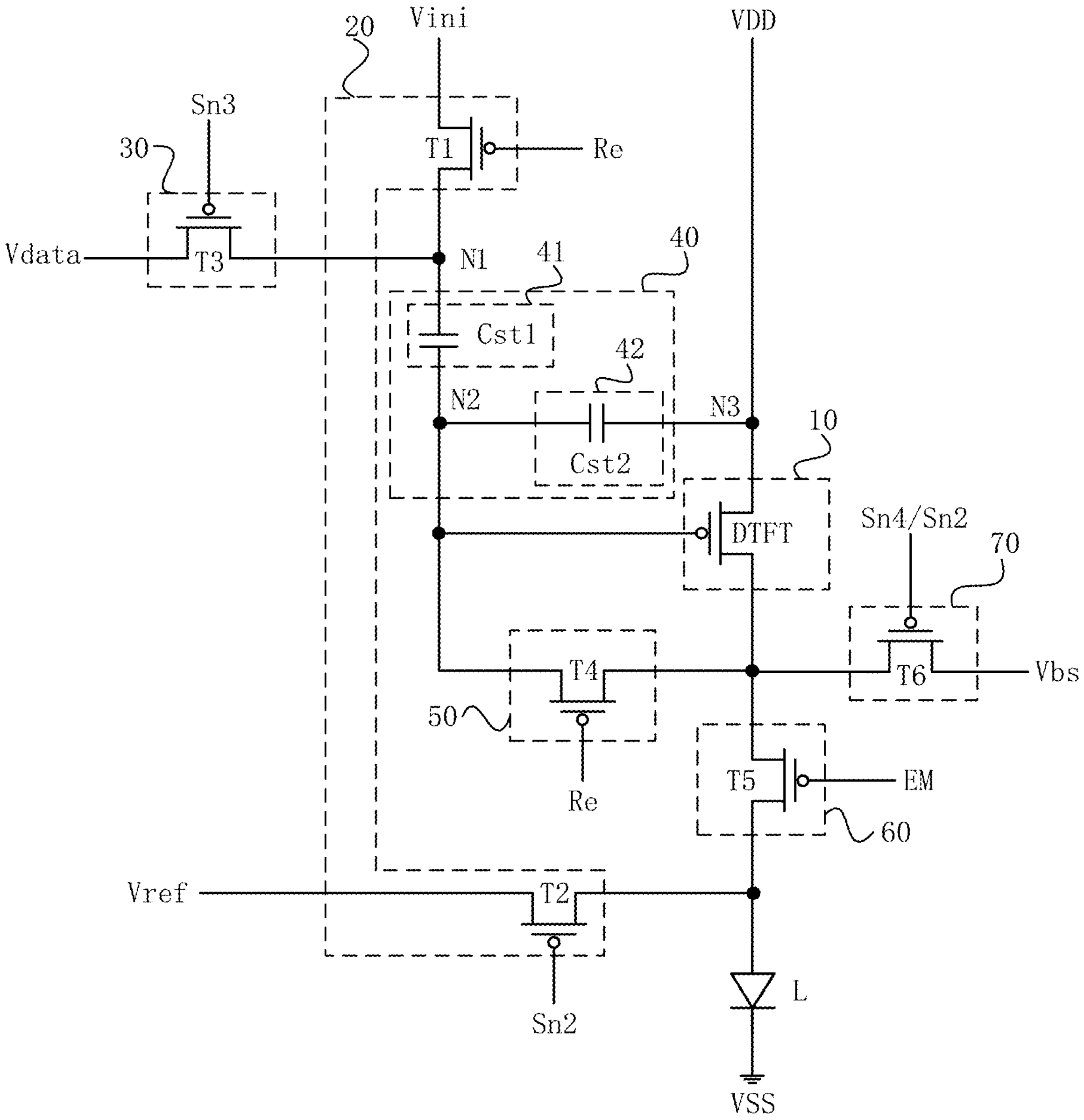
FIG. 12 is a structure diagram of another array substrate according to an embodiment of the present application.

FIG. 12 is a structure diagram of another array substrate according to an embodiment of the present application. With reference to FIG. 12, on the basis of the above embodiments, the array substrate further includes a bias module 70. The bias module 70 is electrically connected to the second terminal of the drive module 10, and the bias module 70 is used to receive a fourth control signal Sn4 and a bias signal Vbs. The bias module 70 is configured to, in response to the fourth control signal Sn4, transmit the bias signal Vbs to the second terminal of the drive module 10 in the initialization stage.

For example, the bias module 70 includes a sixth transistor T6. A first electrode of the sixth transistor T6 is used to receive the bias signal Vbs, a second electrode of the sixth transistor T6 is electrically connected to the second electrode of the drive transistor DTFT, and a control electrode of the sixth transistor T6 is used to receive the fourth control signal Sn4. The sixth transistor T6 is switched on in response to the fourth control signal Sn4 in the initialization stage to apply a bias to the second electrode of the drive transistor DTFT for accelerating the recovery of the characteristics of the drive transistor DTFT and overcoming the afterimage problem.

The second control signal Sn2 is reused as the fourth control signal Sn4, thereby reducing the number of control signal lines and simplifying the design of the scan circuit. The array substrate is still driven by the drive timing shown in FIG. 3 or 5, and the driving process will not be repeated.

On the basis of the above embodiments, the fourth transistor T4 is set as a double-gate transistor to reduce the leakage of the gate of the drive transistor DTFT in the light emission stage.

On the basis of the above embodiments, the first power signal VDD is reused as the first initialization signal Vini to reduce the number of control signal lines, thereby facilitating the wiring design of the display panel.

On the basis of the above embodiments, the light emission control signal EM and the first control signal Re are set and a scan circuit of one stage drives one row of pixel circuits or are set and a scan circuit of one stage drives multiple rows of pixel circuits. When the light emission control signal EM and the first control signal Re are set and a scan circuit of one stage drives multiple rows of pixel circuits, the pulse width of the light emission control signal EM needs to be large enough to cover the pulse of the third control signal Sn3 in the multiple rows of pixel circuits.

In the above embodiments, the first electrode of each transistor is referred to as the source or the drain, and accordingly, the second electrode of each transistor is referred to as the drain or the source; due to the symmetrical structure of the transistors in the display panel, no distinction is made herein between the source and the drain of each transistor.

Figure 13:
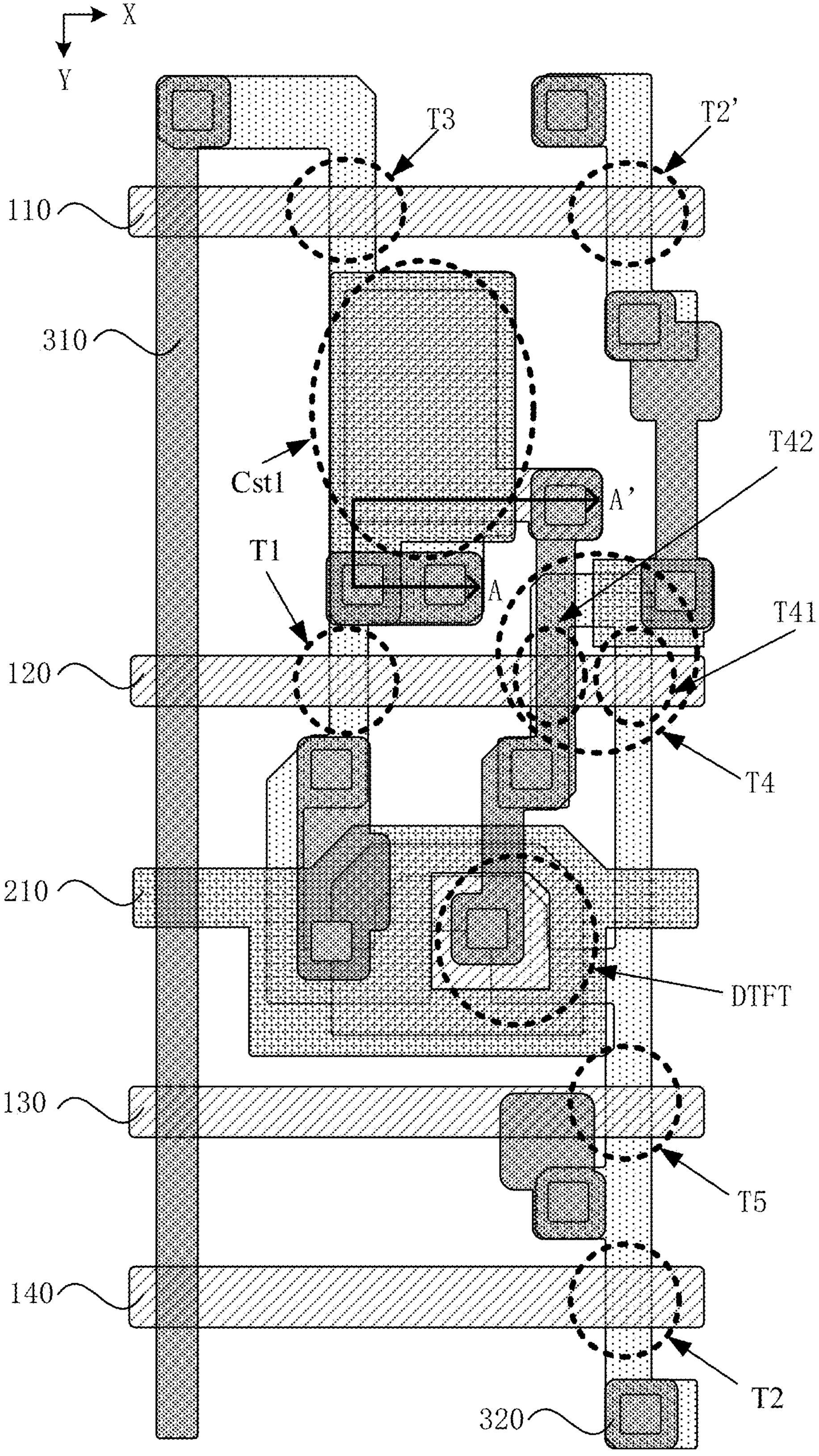
FIG. 13 is a layout diagram of the array substrate of FIG. 4.

The layout arrangement of the array substrate will be described below using the array substrate shown in FIG. 4 as an example. FIG. 13 is a layout diagram of the array substrate of FIG. 4. With reference to FIG. 13, the display panel includes an active layer, a first metal layer, a second metal layer, and a third metal layer which are sequentially stacked.

The first metal layer is provided with a third scan line 110, a first scan line 120, a light emission control signal line 130, and a second scan line 140 which extend in a first direction X and which are sequentially arranged in a second direction Y. The second direction Y is perpendicular to the first direction X. The first scan line 120 is configured to transmit the first control signal to the array substrate. The second scan line 140 is configured to transmit the second control signal to the array substrate. The third scan line 110 is configured to transmit the third control signal to the array substrate. The light emission control signal line 130 is configured to transmit the light emission control signal to the array substrate.

The second metal layer is provided with a first power line 210 extending in the first direction X. The first power line 210 is configured to transmit the first power signal to the array substrate. In addition, the first power line 210 is reused as the first initialization signal line, and the first power signal is reused as the first initialization signal.

The third metal layer is provided with a data line 310 and a second initialization signal line 320. The data line 310 extends in the second direction Y and is configured to transmit the data signal to the array substrate. The second initialization signal line 320 is configured to transmit the second initialization signal to the array substrate.

The active layer is provided with the channel regions and source-drain regions of the transistors. The transistor is in a symmetrical structure, and no distinction is made between the source region and the drain region of each transistor in the embodiments of the present application. The portion where each signal line disposed in the first metal layer overlaps the active layer constitutes a transistor in the array substrate; each signal line disposed in the first metal layer is reused as a control electrode of each transistor. The portion of the active layer covered with each signal line serves as a channel region of the corresponding transistor, and the two sides of the channel region are a source region and a drain region, respectively. For example, the source region of each transistor corresponds to its first electrode and the drain region corresponds to its second electrode.

The flat S-shaped portion in the middle of the active layer overlaps the first metal layer to form the drive transistor DTFT. The left overlapping portion between the active layer and the first scan line 120 forms the first transistor T1. The right overlapping portion between the active layer and the first scan line 120 forms the fourth transistor T4, and the fourth transistor T4 is set in a double-gate structure. The overlapping portion between the active layer and the third scan line 110 forms the third transistor T3. The overlapping portion between the active layer and the light emission control signal line 130 forms the fifth transistor T5. The overlapping portion between the active layer and the second scan line 140 forms the second transistor T2.

In addition, the gate of the drive transistor DTFT serves as the plate of the first electrode of the second capacitor Cst2, and the plate of the second electrode of the second capacitor Cst2 is disposed in the second metal layer and is directly electrically connected to the first power line 210. In one embodiment, the plate of the second electrode of the second capacitor Cst2 is disposed in the third metal layer and is electrically connected to the first power line 210 through a via.

The first capacitor Cst1 is disposed in the spacing portion between the first transistor T1 and the third transistor T3 of the array substrate so that the blank portion in the layout of the array substrate is reasonably used to form a capacitor, thereby saving the layout area. For example, the plates of the two electrodes of the first capacitor Cst1 are be disposed in any two metal layers.

For example, the source region of the third transistor T3 is connected to the data line 310 through a via, and the drain region of the third transistor T3 is electrically connected to the first electrode of the first capacitor Cst1. The source region of the first transistor T1 is connected to the first power line 210 through a via and a bridge located in the third metal layer, and the drain region of the first transistor T1 is electrically connected to the first electrode of the first capacitor Cst1. The source region of the first sub-transistor T41 in the fourth transistor T4 is connected to the source region of the fifth transistor T5, the drain region of the first sub-transistor T41 is connected to the source region of the second sub-transistor T42 in the fourth transistor T4, and the drain region of the second sub-transistor T42 is connected to the control electrode of the drive transistor DTFT through a via and a bridge located in the third metal layer. The source region of the fifth transistor T5 is connected to the drain region of the drive transistor DTFT, the drain region of the fifth transistor T5 is connected to the drain region of the second transistor T2, and the source region of the second transistor T2 is connected to the second initialization signal line 320 through a via.

On the basis of the above embodiments, the second scan line 140 of the pixel circuit of the current row is reused as the third scan line 110 of the pixel circuit of the next row. The third transistor T3 of the pixel circuit of the current row shares a scan line with the second transistor T2' of the pixel circuit of the previous row. In this manner, the layout area can be effectively saved.

Figure 14:
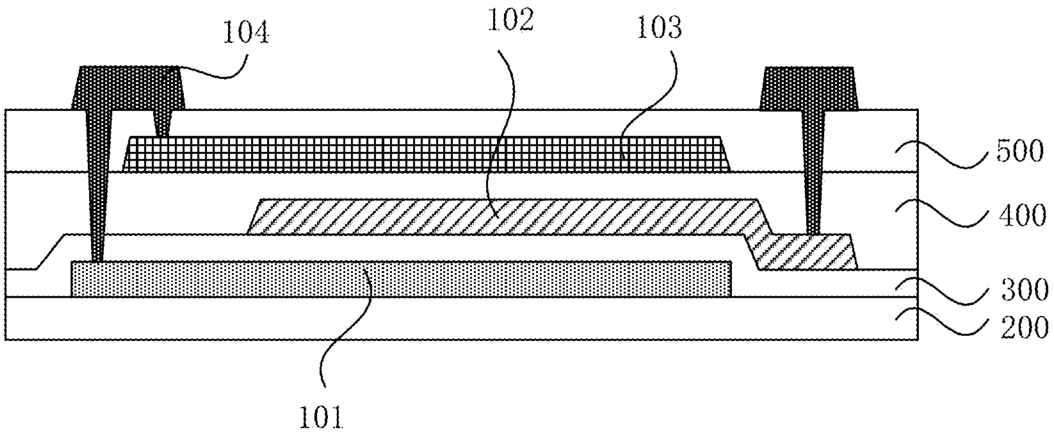
FIG. 14 is a sectional view taken along A-A' of FIG. 13.

The layout of the first capacitor Cst1 will be described below. FIG. 14 is a sectional view taken along A-A' of FIG. 13. In conjunction with FIGS. 13 and 14, in one embodiment, the first capacitor Cst1 adopts a sandwich capacitor structure composed of three layers of electrodes to increase the capacitance per unit area, thereby saving the layout area and achieving high resolution.

For example, the first capacitor Cst1 includes a first electrode 101, a second electrode 102, and a third electrode 103 which are sequentially stacked, and the first electrode 101 and the third electrode 103 are each provided with a portion that is directly opposite to the second electrode 102. The first electrode 101 is electrically connected to the third electrode 103, the first terminal of the first capacitor Cst1 is led out from the first electrode 101 or the third electrode 103, and the second terminal of the first capacitor Cst1 is led out from the second electrode 102.

For example, the first electrode 101 is disposed in the active layer, and at this point, polycrystalline silicon (Psi) of the active layer needs to be additionally doped to conductorize the Psi at the first electrode 101 to form a capacitor plate. The second electrode 102 is disposed in the first metal layer, and the third electrode 103 is disposed in the second metal layer. For example, the first electrode 101 is directly electrically connected to the third electrode 103 through a via or is electrically connected to the third electrode 103 through a via and a bridge 104 located in the third metal layer.

With continued reference to FIG. 14, on the basis of the above embodiments, the film structure of the array substrate further includes a substrate layer 200, a gate insulating layer 300, a first interlayer insulating layer 400, and a second interlayer insulating layer 500. The substrate layer 200 is disposed below the active layer and is a glass substrate layer. The active layer is prepared using a polysilicon material. The gate insulating layer 300 is disposed between the active layer and the first metal layer and is prepared using a material such as silicon oxide. The first interlayer insulating layer 400 is disposed between the first metal layer and the second metal layer and is prepared using a material such as silicon nitride. The second interlayer insulating layer 500 is disposed between the second metal layer and the third metal layer and includes a silicon nitride material and a silicon oxide material which are stacked.

The embodiments of the present application further provide a display panel. The display panel includes the array substrate provided by any embodiment of the present application, and the details are not repeated here.

The embodiments of the present application further provide a driving method of an array substrate. The driving method is applicable to the array substrate provided by any embodiment of the present application. FIG. 15 is a flowchart of a driving method of an array substrate according to an embodiment of the present application. With reference to FIG. 15, the driving method of the array substrate includes S110, S120, S130, and S140.

In S110, in an initialization stage, the initialization module transmits, in response to the first control signal, the first initialization signal to the first connection terminal of the storage module; the initialization module transmits, in response to the second control signal, the second initialization signal to the second terminal of the light emission control module; the light emission control module is switched on in response to the light emission control signal and the threshold compensation module is switched on in response to the first control signal to enable the second initialization signal to be transmitted to the control terminal of the drive module; the storage module stores a potential difference between the first initialization signal and the second initialization signal.

In S120, in a threshold compensation stage, the threshold compensation module is switched on in response to the first control signal to enable the first power signal to charge the second connection terminal of the storage module through the drive module and the threshold compensation module until a potential difference between the second connection terminal of the storage module and the third connection terminal of the storage module is equal to a threshold voltage of the drive module, and the drive module is switched off; the storage module stores the threshold voltage.

In S130, in a data write stage, the data write module is switched on in response to the third control signal to write the data signal to the first connection terminal of the storage module; the storage module couples the potential change of the first connection terminal of the storage module to the second connection terminal of the storage module.

In S140, in a light emission stage, the drive module generates a drive current according to a potential of the control terminal of the drive module, and the light emission control module is switched on in response to the light emission control signal to provide a flow path for the drive current to enable the drive current to drive the light-emitting diode to emit light.

In the driving method of an array substrate provided by the embodiments of the present application, the threshold compensation stage is set separately from the data write stage, thereby achieving the display brightness uniformity of the display panel, high resolution of the display panel, and a high refresh rate of the display panel.

What is claimed is:

1. An array substrate, comprising:

a drive module, wherein a first terminal of the drive module is used to receive a first power signal;

a storage module, wherein a, a second connection terminal of the storage module is electrically connected to a control terminal of the drive module, and a third connection terminal of the storage module is used to receive the first power signal; the storage module is configured to store a potential difference between the first connection terminal of the storage module and the second connection terminal of the storage module in an initialization stage, store a threshold voltage of the drive module in a threshold compensation stage, and couple a potential change of the first connection terminal of the storage module to the second connection terminal of the storage module in a data write stage;

a light emission control module, wherein a first terminal of the light emission control module is electrically connected to a second terminal of the drive module, and a second terminal of the light emission control module is electrically connected to a first electrode of a light-emitting diode; the light emission control module is configured to be switched on in response to a light emission control signal in the initialization stage and a light emission stage;

an initialization module, wherein a first connection terminal of the storage module is electrically connected to a first output terminal of the initialization module, a second output terminal of the initialization module is electrically connected to the second terminal of the light emission control module; the initialization module is configured to transmit, in response to a first control signal, a first initialization signal to the first connection terminal of the storage module in the initialization stage and the threshold compensation stage and transmit, in response to a second control signal, a second initialization signal to the first electrode of the light-emitting diode in the initialization stage;

a threshold compensation module, wherein the threshold compensation module is electrically connected to the control terminal of the drive module and the second terminal of the drive module; the threshold compensation module is configured to be, in response to the first control signal, switched on in the initialization stage to cooperate with the initialization module and the light emission control module to transmit the second initialization signal to the control terminal of the drive module and switched on in the threshold compensation stage to enable the first power signal to charge the second connection terminal of the storage module through the drive module and the threshold compensation module;

a data write module, wherein a first connection terminal of the storage module is electrically connected to an output terminal of the data write module, the data write module is configured to be, in response to a third control signal, switched on in the data write stage to write a data signal to the first connection terminal of the storage module;

wherein the third control signal and the first control signal are provided by different groups of scan circuits, wherein the second control signal and the third control signal are provided by cascaded first scan circuits in different stages in a same group, and the second control signal is provided by a first scan circuit in a next stage of a first scan circuit used for outputting the third control signal.

2. The array substrate according to claim 1, wherein the storage module comprises:

a first storage unit connected between the first connection terminal of the storage module and the second connection terminal of the storage module; wherein the first storage unit is configured to store the potential difference between the first connection terminal of the storage module and the second connection terminal of the storage module in the initialization stage and couple the potential change of the first connection terminal of the storage module to the second connection terminal of the storage module in the data write stage; and a second storage unit connected between the second connection terminal of the storage module and the third connection terminal of the storage module; wherein the second storage unit is configured to store the threshold voltage of the drive module in the threshold compensation stage.

3. The array substrate according to claim 2, wherein the first storage unit comprises a first capacitor; wherein a first terminal of the first capacitor is electrically connected to the first connection terminal of the storage module, and a second terminal of the first capacitor is electrically connected to the second connection terminal of the storage module;

the second storage unit comprises a second capacitor; wherein a first terminal of the second capacitor is electrically connected to the second connection terminal of the storage module, and a second terminal of the second capacitor is electrically connected to the third connection terminal of the storage module.

4. The array substrate according to claim 3, wherein the first capacitor comprises a first electrode, a second electrode, and a third electrode, the first electrode of the first capacitor, the second electrode of the first capacitor, and the third electrode of the first capacitor are sequentially stacked, and the first electrode of the first capacitor and the third electrode of the first capacitor are each provided with a portion directly opposite to the second electrode of the first capacitor; wherein the first electrode of the first capacitor is electrically connected to the third electrode of the first capacitor, the first terminal of the first capacitor is led out from the first electrode of the first capacitor or the third electrode of the first capacitor, and the second terminal of the first capacitor is led out from the second electrode of the first capacitor.

5. The array substrate according to claim 4, wherein the first electrode of the first capacitor is disposed in an active layer, the second electrode of the first capacitor is disposed in a first metal layer, and the third electrode of the first capacitor is disposed in a second metal layer.

6. The array substrate according to claim 1, wherein the drive module comprises a drive transistor; wherein a control electrode of the drive transistor serves as the control terminal of the drive module, a first electrode of the drive transistor serves as the first terminal of the drive module, and a second electrode of the drive transistor serves as the second terminal of the drive module;

the initialization module comprises a first transistor and a second transistor; wherein a first electrode of the first transistor is used to receive the first initialization signal, a second electrode of the first transistor is electrically connected to the first connection terminal of the storage module, and a control electrode of the first transistor is used to receive the first control signal; a first electrode of the second transistor is used to receive the second initialization signal, a second electrode of the second transistor is electrically connected to the second terminal of the light emission control module, and a control electrode of the second transistor is used to receive the second control signal;

the data write module comprises a third transistor; wherein a first electrode of the third transistor is used to receive the data signal, a second electrode of the third transistor is electrically connected to the first connection terminal of the storage module, and a control electrode of the third transistor is used to receive the third control signal;

the threshold compensation module comprises a fourth transistor; wherein a first electrode of the fourth transistor is electrically connected to the second electrode of the drive transistor, a second electrode of the fourth transistor is electrically connected to the control electrode of the drive transistor, and a control electrode of the fourth transistor is used to receive the first control signal;

the light emission control module comprises a fifth transistor; wherein a first electrode of the fifth transistor is electrically connected to the second electrode of the drive transistor, a second electrode of the fifth transistor is electrically connected to the first electrode of the light-emitting diode, and a control electrode of the fifth transistor is used to receive the light emission control signal.

7. The array substrate according to claim 6, wherein the fourth transistor is a double-gate transistor.

8. The array substrate according to claim 6, wherein the first power signal is reused as the first initialization signal.

9. The array substrate according to claim 6, wherein a channel type of the fourth transistor is the same as a channel type of the first transistor and the channel type of the fourth transistor is different from a channel type of the fifth transistor.

10. The array substrate according to claim 9, wherein the first control signal and the light emission control signal are provided by cascaded second scan circuits in different stages in a same group, and the first control signal is provided by a second scan circuit in a previous stage of a second scan circuit used for outputting the light emission control signal.

11. The array substrate according to claim 1, further comprising a bias module electrically connected to the second terminal of the drive module; wherein the bias module is configured to transmit, in response to a fourth control signal, a bias signal to the second terminal of the drive module in the initialization stage.

12. The array substrate according to claim 11, wherein the bias module comprises a sixth transistor; wherein a first electrode of the sixth transistor is used to receive the bias signal, a second electrode of the sixth transistor is electrically connected to the second terminal of the drive module, and a control electrode of the sixth transistor is used to receive the fourth control signal.

13. The array substrate according to claim 11, wherein the second control signal is reused as the fourth control signal.

14. The array substrate according to claim 1, wherein the first control signal configures a duration of the threshold compensation stage by adjusting a pulse width of the first control signal.

15. The array substrate according to claim 1, wherein the array substrate comprises a plurality of pixel circuits, a holding time of the data write stage is greater than one row time, and the row time is a holding time for a driver chip to provide a data signal required by one row of pixel circuits among the plurality of pixel circuits.

16. The array substrate according to claim 6, wherein in a case where the second transistor is used to receive the first control signal, a channel type of the second transistor is set to be the same as a channel type of the fourth transistor.

17. The array substrate according to claim 1, wherein the array substrate comprises a plurality of pixel circuits, the light emission control signal and the first control signal are set, wherein a scan circuit of one stage drives one row of pixel circuits among the plurality of pixel circuits, or the light emission control signal and the first control signal are set, wherein a scan circuit of one stage drives a plurality of rows of pixel circuits among the plurality of pixel circuits.

18. A display panel, comprising an array substrate, wherein the array substrate comprises:

a drive module, wherein a first terminal of the drive module is used to receive a first power signal;

a storage module, wherein a, a second connection terminal of the storage module is electrically connected to a control terminal of the drive module, and a third connection terminal of the storage module is used to receive the first power signal; the storage module is configured to store a potential difference between the first connection terminal of the storage module and the second connection terminal of the storage module in an initialization stage, store a threshold voltage of the drive module in a threshold compensation stage, and couple a potential change of the first connection terminal of the storage module to the second connection terminal of the storage module in a data write stage;

a light emission control module, wherein a first terminal of the light emission control module is electrically connected to a second terminal of the drive module, and a second terminal of the light emission control module is electrically connected to a first electrode of a light-emitting diode; the light emission control module is configured to be switched on in response to a light emission control signal in the initialization stage and a light emission stage;

an initialization module, wherein a first connection terminal of the storage module is electrically connected to a first output terminal of the initialization module, a second output terminal of the initialization module is electrically connected to the second terminal of the light emission control module; the initialization module is configured to transmit, in response to a first control signal, a first initialization signal to the first connection terminal of the storage module in the initialization stage and the threshold compensation stage and transmit, in response to a second control signal, a second initialization signal to the first electrode of the light-emitting diode in the initialization stage;

a threshold compensation module, wherein the threshold compensation module is electrically connected to the control terminal of the drive module and the second terminal of the drive module; the threshold compensation module is configured to be, in response to the first control signal, switched on in the initialization stage to cooperate with the initialization module and the light emission control module to transmit the second initialization signal to the control terminal of the drive module and switched on in the threshold compensation stage to enable the first power signal to charge the second connection terminal of the storage module through the drive module and the threshold compensation module;

a data write module, wherein a first connection terminal of the storage module is electrically connected to an output terminal of the data write module, the data write module is configured to be, in response to a third control signal, switched on in the data write stage to write a data signal to the first connection terminal of the storage module;

wherein the third control signal and the first control signal are provided by different groups of scan circuits.

19. A driving method of an array substrate, used for driving an array substrate, wherein the array substrate comprises:

a drive module, wherein a first terminal of the drive module is used to receive a first power signal;

a storage module, wherein a, a second connection terminal of the storage module is electrically connected to a control terminal of the drive module, and a third connection terminal of the storage module is used to receive the first power signal; the storage module is configured to store a potential difference between the first connection terminal of the storage module and the second connection terminal of the storage module in an initialization stage, store a threshold voltage of the drive module in a threshold compensation stage, and couple a potential change of the first connection terminal of the storage module to the second connection terminal of the storage module in a data write stage;

a light emission control module, wherein a first terminal of the light emission control module is electrically connected to a second terminal of the drive module, and a second terminal of the light emission control module is electrically connected to a first electrode of a light-emitting diode; the light emission control module is configured to be switched on in response to a light emission control signal in the initialization stage and a light emission stage;

an initialization module, wherein a first connection terminal of the storage module is electrically connected to a first output terminal of the initialization module, a second output terminal of the initialization module is electrically connected to the second terminal of the light emission control module; the initialization module is configured to transmit, in response to a first control signal, a first initialization signal to the first connection terminal of the storage module in the initialization stage and the threshold compensation stage and transmit, in response to a second control signal, a second initialization signal to the first electrode of the light-emitting diode in the initialization stage;

a threshold compensation module, wherein the threshold compensation module is electrically connected to the control terminal of the drive module and the second terminal of the drive module; the threshold compensation module is configured to be, in response to the first control signal, switched on in the initialization stage to cooperate with the initialization module and the light emission control module to transmit the second initialization signal to the control terminal of the drive module and switched on in the threshold compensation stage to enable the first power signal to charge the second connection terminal of the storage module through the drive module and the threshold compensation module;

a data write module, wherein a first connection terminal of the storage module is electrically connected to an output terminal of the data write module, the data write module is configured to be, in response to a third control signal, switched on in the data write stage to write a data signal to the first connection terminal of the storage module;

wherein the third control signal and the first control signal are provided by different groups of scan circuits; and the method comprises:

in an initialization stage, transmitting, by the initialization module in response to the first control signal, the first initialization signal to the first connection terminal of the storage module;

transmitting, by the initialization module in response to the second control signal, the second initialization signal to the second terminal of the light emission control module; switching on the light emission control module in response to the light emission control signal and switching on the threshold compensation module in response to the first control signal to enable the second initialization signal to be transmitted to the control terminal of the drive module; storing, by the storage module, a potential difference between the first initialization signal and the second initialization signal;

in a threshold compensation stage, switching on the threshold compensation module in response to the first control signal to enable the first power signal to charge the second connection terminal of the storage module through the drive module and the threshold compensation module until a potential difference between the second connection terminal of the storage module and the third connection terminal of the storage module is equal to a threshold voltage of the drive module, and switching off the drive module; storing, by the storage module, the threshold voltage;

in a data write stage, switching on the data write module in response to the third control signal to write the data signal to the first connection terminal of the storage module; coupling, by the storage module, the potential change of the first connection terminal of the storage module to the second connection terminal of the storage module;

in a light emission stage, generating, by the drive module, a drive current according to a potential of the control terminal of the drive module, and switching on the light emission control module in response to the light emission control signal to provide a flow path for the drive current to enable the drive current to drive the light-emitting diode to emit light.

* * * * *